(12) United States Patent
Wirola et al.

(10) Patent No.: US 9,769,783 B2
(45) Date of Patent: Sep. 19, 2017

(54) UPDATING OF COVERAGE AREA REPRESENTATIONS BASED ON NEGATIVE HITS

(75) Inventors: Lauri Aarne Johannes Wirola, Tampere (FI); Tommi Antero Laine, Tampere (FI)

(73) Assignee: Nokia Technologies Oy, Espoo (FI)

( * ) Notice: Subject to any disclaimer, the term of this patent is extended or adjusted under 35 U.S.C. 154(b) by 101 days.

(21) Appl. No.: 14/384,384

(22) PCT Filed: Mar. 15, 2012

(86) PCT No.: PCT/IB2012/051229
§ 371 (c)(1),
(2), (4) Date: Dec. 28, 2014

(87) PCT Pub. No.: WO2013/136126
PCT Pub. Date: Sep. 19, 2013

(65) Prior Publication Data
US 2015/0141039 A1    May 21, 2015

(51) Int. Cl.
*H04W 24/00* (2009.01)
*H04W 64/00* (2009.01)
(Continued)

(52) U.S. Cl.
CPC ........... *H04W 64/00* (2013.01); *H04W 16/18* (2013.01); *H04W 24/02* (2013.01)

(58) Field of Classification Search
USPC .... 455/404.2, 429, 432.1–453, 456.1–456.4; 370/328–334, 337–343
See application file for complete search history.

(56) References Cited

U.S. PATENT DOCUMENTS

| | | | |
|---|---|---|---|
| 2009/0215468 A1* | 8/2009 | Miyano | G01S 19/252 455/456.1 |
| 2009/0318132 A1* | 12/2009 | Chiou | H04W 24/08 455/423 |

(Continued)

FOREIGN PATENT DOCUMENTS

| | | |
|---|---|---|
| WO | 2010/101551 A1 | 9/2010 |
| WO | 2011135406 | 11/2011 |
| WO | 2011158063 | 12/2011 |

OTHER PUBLICATIONS

"3rd Generation Partnership Project;Technical Specification Group Radio Access Network;Evolved Universal Terrestrial Radio Access (E-UTRA);LTE Positioning Protocol (LLP) (Release 10)", 3GPP TS 36.355, V10.2.0, Jun. 2011, pp. 1-114.

(Continued)

*Primary Examiner* — Dai A Phuong
(74) *Attorney, Agent, or Firm* — Locke Lord LLP

(57) ABSTRACT

It is inter alia disclosed to obtain or generate detection data. The detection data comprises position data that is indicative of a position of a terminal and one or more identifiers respectively related to one or more coverage areas detected by the terminal. A negative hit for at least a region of a coverage area representation associated with a coverage area is detected, if at least all of the following conditions (i)-(iii) hold: (i) a class of the coverage area matches at least one class of one or more coverage areas for which respective identifiers are comprised or at least expected to be comprised in the detection data, (ii) the position of the terminal is within the region, and (iii) the detection data does not comprise an identifier related to the coverage area associated with the coverage area representation. At least information on the detected negative hit is used and/or provided for deciding if the region of the coverage area representation shall remain part of the coverage area representation or shall (Continued)

be removed from the coverage area representation, and/or for deciding whether a frequency of generating detection data shall be increased.

23 Claims, 10 Drawing Sheets

(51) Int. Cl.
*H04W 16/18* (2009.01)
*H04W 24/02* (2009.01)

(56) References Cited

U.S. PATENT DOCUMENTS

| | | | | |
|---|---|---|---|---|
| 2010/0075658 A1* | 3/2010 | Hou | ...................... | H04W 48/02 455/422.1 |
| 2010/0329181 A1* | 12/2010 | Lan | ...................... | H04W 48/18 370/328 |
| 2011/0028162 A1* | 2/2011 | Hazzani | .................. | G01S 5/021 455/456.1 |
| 2011/0269448 A1* | 11/2011 | Chen | .................... | H04W 48/12 455/422.1 |
| 2012/0015650 A1* | 1/2012 | Pudney | ................... | H04W 8/08 455/434 |
| 2012/0052835 A1* | 3/2012 | Bull | ...................... | G01S 5/0252 455/404.2 |
| 2012/0115467 A1* | 5/2012 | Conte | ............... | H04W 52/0225 455/434 |
| 2013/0044709 A1* | 2/2013 | Adjakple | ............ | H04W 76/025 370/329 |
| 2013/0079003 A1* | 3/2013 | Nagaraja | ............... | H04W 24/02 455/435.1 |
| 2013/0165103 A1* | 6/2013 | Ammari | ................ | H04W 48/04 455/418 |
| 2016/0066189 A1* | 3/2016 | Mahaffey | ............ | G06F 21/316 455/405 |
| 2016/0157042 A1* | 6/2016 | Brisebois | ............ | H04L 41/0893 455/418 |

OTHER PUBLICATIONS

International Search Report and Written Opinion received for corresponding Patent Cooperation Treaty Application No. PCT/IB2012/051229, mailed Feb. 6, 2013, 11 pages.

EP Communication dated Nov. 28, 2016 for European Patent Application No. 12714846.8, 5 pages.

* cited by examiner

UPDATING OF COVERAGE AREA REPRESENTATIONS BASED ON NEGATIVE HITS

RELATED APPLICATION

This application was originally filed as PCT Application No. PCT/IB2012/051229 filed Mar. 15, 2012.

FIELD

Embodiments of this invention relate to the field of maintaining and updating coverage area representations to be provided to and used by terminals for positioning purposes.

BACKGROUND

As an alternative or add-on to satellite-based positioning systems, positioning systems in which a present position of a terminal is estimated based on an identification of coverage areas that can currently be detected by the terminal have gained recent interest. For instance, a terminal may identify all currently detectable coverage areas, which are provided by Coverage-Providing Entities (CPEs) (such as for instance base stations of a cellular Communication System (CS), or Wireless Local Area Network (WLAN) Access Points (APs)), and consult a local or remote database that provides Coverage Area Representations (CARs, e.g. models for the coverage areas) for the identified coverage areas.

In a simple case, such a CAR may at least comprise the position of the CPE (e.g. a WLAN access point) that provides the coverage area detected by the terminal. In more elaborate cases, a CAR may for instance describe the position, dimensions and orientation of an elliptical model of the coverage area provided by the CPE (e.g. a base station of a cellular mobile communication system).

For instance, given that (only) the positions of the CPEs of the detected coverage areas are known at the terminal, and distances from the terminal to the heard CPEs can be estimated, the terminal's position can be estimated through triangulation. The distance between a terminal and the heard CPEs can for instance be estimated based on the path loss using a channel model (i.e. how much the signal attenuates between the terminal and the CPE) or based on timing (or round-trip timing) measurements (i.e. information expressing how long signals propagate between terminal and CPE).

Alternatively, if more elaborate CARs are available are known, a terminal may pick the CARs for the detected coverage areas and find the intersection of these CARs. The terminal can then be assigned a position that is, for instance, the center-of-mass of the intersection area. Similarly, an error estimate for the position estimate can be given, for example, based on the size of the intersection.

The CARs can for instance be generated based on a plurality of detections performed by terminals that are able to determine their current position (e.g. by means of satellite-based positioning) and to identify the coverage areas that they can currently detect. Such information can then be assembled and sent (as a so-called fingerprint) to a server that selectively analyzes the fingerprints received with respect to each coverage area. For instance, from all fingerprints received, the server may extract all positions at which terminals were able to detect a specific coverage area. A representation of the boundary and/or shape of this plurality of positions, e.g. an ellipse fitted to this boundary and/or the mean value plus covariance of the samples, then already can serve as a CAR for this specific coverage area. Similarly, respective CARs for further coverage areas can be extracted.

SUMMARY OF SOME EMBODIMENTS OF THE INVENTION

Assuming for instance that a CAR for a coverage area already has been determined, and that this coverage area remains static or only grows, it is possible to update the CAR by collecting further fingerprints, extracting the terminal positions that have been reported for this coverage area from the fingerprints and accordingly adapting (extending) the CAR.

However, in case of a coverage area for which a CAR has been determined, but which then moves (e.g. translates or rotates), shrinks or even disappears, updating of the CAR becomes a delicate task.

An example embodiment of a method according to the invention comprises:
generating or obtaining detection data, the detection data comprising:
position data that is indicative of a position of a terminal and
one or more identifiers respectively related to one or more coverage areas detected by the terminal, and
detecting a negative hit for at least a region of a CAR associated with a coverage area, if at least all of the following conditions (i)-(iii) hold:
(i) a class of the coverage area matches at least one class of one or more coverage areas for which respective identifiers are comprised or at least expected to be comprised in the detection data,
(ii) the position of the terminal is within the region, and
(iii) the detection data does not comprise an identifier related to the coverage area associated with the CAR.

Therein, according to a first aspect of the example embodiment of a method according to the invention, at least information on the detected negative hit is used (by the apparatus that performs the generating/obtaining and the detecting) and/or provided (from the apparatus that performs the generating/obtaining and the detecting) for deciding if the region of the CAR shall remain part of the CAR or shall be removed from the CAR. According to a second aspect of the example embodiment of a method according to the invention, at least information on the detected negative hit is used and/or provided for deciding whether a frequency of generating detection data shall be increased.

In the following, a general description of the example embodiment of a method according to the invention will be given. Features particularly pertaining to the first or second aspect of this example embodiment will be indicated as such. It should nevertheless be noted that both the first and second aspect can also be jointly realized in a method, apparatus, computer program or system.

The example embodiment of the method according to the invention may for instance be performed by an apparatus.

The apparatus may for instance be a server, for instance a server that is part (e.g. a module) of a radiomap database or connected to a radiomap database, with the radiomap database at least storing the CAR. The apparatus may then, and also in other cases, perform the obtaining (e.g. receiving, for instance via a wireless or wired communication link) of the detection data (e.g. from the terminal, for instance directly or indirectly) and the detecting of the negative hit.

Alternatively, the apparatus may for instance be a terminal. The apparatus may then, and also in other cases, perform the detecting of the negative hit and at least one of the generating and the obtaining of the detection data. The apparatus may then for instance at least store the CAR.

The terminal may be a mobile terminal (e.g. a portable device, such as for instance a mobile phone, a personal digital assistant, a laptop or tablet computer, to name but a few examples) or fixed (stationary) terminal (e.g. a sensor). The mobile terminal may for instance be a dedicated detection data collector device, i.e. a device having as a main purpose the collection of the detection data. Equally well, the terminal may be a portable device such as a mobile phone or a mobile multimedia device that has detection data collection only as an additional function. In both cases, the mobility of the mobile terminal is exploited to gather detection data related to various positions across the coverage area or even across several coverage areas.

A coverage area may for instance be understood as an area in which one or more coverage-providing entities provide coverage (e.g. radio coverage). For instance, terminals located within the coverage area are enabled to at least receive and decode an identifier from at least one of the one or more coverage-providing entities and/or to communicate in a communication system of which the one or more coverage-providing entities are a part of. A coverage area in case of radio coverage generally depends on a plurality of parameters of both the coverage-providing entity (inter alia antenna beamwidth and positioning, transmission power) and the propagation environment (inter alia pathloss and shadowing caused by obstructing elements).

A CAR is associated with a coverage area. A CAR may for instance be or at least be desired to be representative of a coverage area. However, at least temporary deviations may occur between the CAR and the actual coverage area, for instance in case of changes or movement of the coverage area.

A CAR may for instance represent a coverage area by means of a model. This model may for instance be a model representing hard boundaries of a coverage area, or a model that represents a coverage area in a statistical sense, for instance by means of a probability (density) function. An example of such a statistical representation of a coverage model is a multi-normal distribution. A CAR may relate to a coverage area provided by a single CPE, but may equally well relate to coverage areas of multiple CPEs. A CAR may for instance relate to a coverage area of a Radio Network Controller (RNC) or of a coverage area specified by a Location Area Code (LAC), or even to a coverage area of an operator or country.

A CAR may only be a coarse model of a coverage area, e.g. an elliptical or polygonal model. The CAR may equally well be constituted by a set of grids of a grid of regions. Then a granularity of the CAR may be defined by the granularity of the grid of regions.

Non-limiting examples of CPEs are CPEs of wire-bound or wireless CSs. For instance, a CPE may be a base station of a cellular radio CS, such as for instance a second generation (2G), third generation (3G) or fourth generation (4G) CS, or an AP or beacon of a non-cellular radio CS, such as for instance a WLAN system, a Worldwide Interoperability for Microwave Access (WiMAX) system, a Bluetooth system, a radio-frequency identification (RFID) system a broadcasting system such as for instance Digital Video Broadcasting (DVB), Digital Audio Broadcasting (DAB) or Frequency-Modulated (FM)/Amplitude-Modulated (AM) radio, a Near Field Communication (NFC) system, etc.).

A class of a coverage area can for instance pertain to the operator (e.g. the network operator) that provides the coverage areas and/or to the technology (for instance cellular mobile radio or WLAN or Bluetooth) and/or standard (GSM or UMTS or LTE or CDMA/CDMA2000 in case of cellular mobile radio) used to provide the coverage areas. A class can combine one or more network operators and/or technologies and/or standards. A first class of coverage areas may thus for instance pertain to coverage areas provided by one operator for one technology (cellular mobile radio) and two standards (GSM and UMTS). A second class of coverage areas may for instance comprise coverage areas pertaining to WLAN access points only. A class of a coverage area need not necessarily be explicitly signalled or indicated. For instance, a class of a coverage area may be derivable from the identifier related to the coverage area.

The detection data may for instance be generated (e.g. by measurement) by a terminal which is capable of determining its position (e.g. its current position), of detecting one or more coverage areas and of determining the respective identifiers respectively related to the detected coverage areas. Equally well, the detection data may be derived by an entity that is different from the terminal, for instance based on monitoring of the terminal.

A coverage area may for instance be detected by the terminal if the terminal is able to receive one or more signals (e.g. a broadcast channel), which are sent by the CPE providing the coverage area, with a pre-defined minimum quality (for instance defined in terms of a signal-to-noise ratio or a signal-to-noise and interference ratio), and/or may be able to at least partially receive and correctly decode one or more signals sent by the CPE providing the coverage area (e.g a broadcast channel), and/or may be able to receive and correctly decode an identifier of the CPE that provides the coverage area (for instance a Medium Access Control (MAC) address or another identifier). Receiving signals or information from the coverage providing entity (and thus detecting a coverage area provided by the coverage providing entity) may for instance require that the terminal is technically capable to receive such signals or information.

Thus a terminal may have to support the transmission technology (e.g. the communication standard) used by the coverage providing entity. Receiving signals or information from the coverage providing entity (and thus detecting a coverage area provided by the coverage providing entity) may also require that the terminal is entitled to communicate with or at least receive signals or information from the coverage providing entity.

The identifiers related to the coverage area may for instance identify the coverage area and/or the coverage-providing entity that provides the coverage area. Non-limiting examples of such identifiers are cellular cell identifiers (e.g. a Mobile Country Code (MCC), a Mobile Network Code (MNC), a Local Area Code (LAC) and/or a Cell Identity (CID) in case of coverage areas of a 2G mobile communications system, a UTRAN Cell ID (UC-ID) in case of a 3G mobile communications system, or an LTE Cell Identity in case of a 4G communications system), and identifiers of WLAN access points (e,g. a Medium Access Control (MAC) identifier of a WLAN access point).

The position may for instance be determined (e.g. measured or estimated) by the terminal, for instance based on a satellite-based positioning system (like the Global Positioning System (GPS), the GALILEO system or the GLONASS system or enhanced versions thereof, such as for instance Assisted GPS (A-GPS)). Equally well, also non-satellite-based positioning systems may be used for determining the position of the terminal, for instance based on triangulation, or by a user inputting the position into the terminal. Alternatively, the position may for instance also be determined by an entity that is different from the terminal, such as for instance a component (e.g. a Radio Network Controller RNC)) of a communication system that supports communication of the terminal.

The position data (e.g. coordinates) and the one or more identifiers comprised in the detection data may for instance be related to each other in a way that the position data is indicative of a position of the terminal at a time instant at which the terminal is (or was) able to detect all coverage areas to which the identifiers respectively relate. Thus the detection data may only comprise respective identifiers of coverage areas that are detectable by the terminal at the position indicated by the position data.

The detection data may for instance be a so-called "fingerprint". The detection data may comprise further parameters, such as for instance a received signal strength, a code power, a chip power, a timing advance, a path loss or other parameters exploitable to derive a distance of the terminal to a coverage-providing entity and/or a quality of the coverage experienced by the terminal.

The detection data may for instance be generated periodically (e.g. with pre-defined intervals) or in response to one or more trigger events, for instance each time the set of coverage areas that can (for instance currently) be detected by the terminal changes, or in response to an explicit request. In case of periodic generation, for instance a period (or frequency) of a generation of the detection data may be controllable by the terminal or by another entity.

The detection data may for instance be obtained by a component of the terminal, and then also the increasing of the negative hit counter may be performed by the terminal. Alternatively, the detection data may be received (e.g. via a wired or wireless communication link) by a unit that is different from the terminal, for instance a server, and then also the increasing of the negative hit counter may be performed by the other unit.

The region may for instance correspond to the complete CAR, or may only be a part thereof. For instance, the region may be one of a plurality of regions of the CAR. The region may for instance be a region of a grid of multiple regions laid on the CAR. The regions of the grid of regions may for instance be rectangular, but equally well, other shapes (e,g. a triangular or hexagonal shape) are possible. It is also possible that some regions are rectangular (e.g. near a centre of the CAR) and some regions are non-rectangular (e.g. at the border of the CAR). The grid of regions may for instance be a global grid for referencing locations on the Earth.

The CAR may for instance be stored in a database (e.g. a so-called radiomap database). CARs stored in the database may for instance be accessible in the database based on respective identifiers of the coverage areas respectively associated with the CARs (in the database, the identifiers of the coverage areas then also identify the CARs). One possible form of storing a CAR that consists of a set of regions (of a grid of regions) is to assign identifiers to the regions of the grid of regions, and to link those regions that constitute the CAR with an identifier of the coverage area that is associated with the CAR. This may for instance be accomplished by assigning to each identifier of a region of the grid of regions the identifiers (if any) of all CARs in which the region is comprised.

A negative hit is detected if at least all of the conditions (i)-(iii) are met, in particular only when at least all of the conditions (i)-(iii) are met. A negative hit may be considered to occur when detection data is obtained that indicates that the position is within the region of the CAR (which region may also correspond to the entire CAR), but the coverage area associated with the CAR is not identified in the detection data, although a class of the coverage area associated with the CAR matches at least one class of coverage areas identified or at least expected to be identified in the detection.

Therein, it should be noted that the three conditions (i)-(iii) do not necessarily have to be explicitly checked by the apparatus, it is sufficient if they are given when the negative hit is detected. For instance, if no different classes of coverage areas exists, i.e. if all coverage areas are of the same class (e.g. detection data only pertains to WLAN coverage areas, since the terminal is only capable of detecting WLAN coverage areas and also only CARs of WLAN coverage areas exist), an explicit checking of condition (i) may not be necessary. It may then only be necessary to check conditions (ii) and (iii) to be able to detect a negative hit.

Condition (iii) ensures that no negative hits are detected that would otherwise (in the absence of condition (iii)) be caused by detections pertaining to another class of coverage areas than the class of the coverage area associated with the CAR having the region for which the negative hit counter is maintained. For instance, no negative hit for a region of a CAR associated with a WLAN coverage area shall be detected if detection data with a position within the region only pertaining to GSM cells (and thus necessarily not containing an identifier of the WLAN coverage area) is received. Therein, if for instance identifiers of coverage areas of a certain class (e.g. WLAN coverage areas) are comprised in the detection data, it is evident that this detection data pertains to this class of coverage areas (WLAN coverage areas). If for instance no identifiers of coverage areas are contained in the detection data, it may for instance be derived from a type and/or from characteristics and/or from capabilities of the terminal, which class(es) of coverage areas would have been expected in the detection data if the terminal would have detected such coverage areas. For instance, information on the type and/or characteristics and/or capabilities of the terminal may be included in the detection data. The capabilities may for instance indicate which class(es) the terminal is able and/or allowed to detect.

Furthermore, the numbering of the conditions (i)-(iii) shall by no means indicate a sequence of checking or a priority of these conditions.

According to the first aspect of the example embodiment of a method according to the invention, at least information on the detected negative hit (and probably further parameters, such as for instance information on a detected positive hit and/or a threshold as described below) is used and/or provided (e.g. transmitted to another entity, e.g. via a wired or wireless connection) for deciding if the region of the CAR shall remain part of the CAR or shall be removed from the CAR. For instance, if a negative hit counter that counts detected negative hits for a region of the CAR grows (e.g. exceeds a threshold), it may be considered that the region of the CAR to which this negative hit counter pertains is no longer representative of the coverage area and should be removed.

In this first aspect, the deciding may for instance be performed by the same apparatus that performs the generating or obtaining of the detection data and the detecting of the negative hit, or by another apparatus, for instance by an apparatus to which information on the detected negative hit is provided.

In this first aspect, it is thus possible to detect if at least a region of a CAR is out-dated. For instance, by detecting respective negative hits (and for instance tracking them with respective negative hit counters) for a plurality of regions of the CAR, a high-granularity detection of out-dated regions of the coverage area can be performed, which may for instance be particularly useful in case of a shrinking or moving coverage area for which already an associated CAR exists.

The example embodiment of the method according to the invention may, according to its first aspect, for instance further comprise the deciding if the region of the CAR shall remain part of the CAR or shall be removed from the CAR. The deciding may for instance be performed each time when a negative hit is detected, or when a pre-defined or (e.g. adaptively) determined time period has lapsed (for instance regularly), and/or if a pre-defined or (e.g. adaptively) determined number of negative hits has been detected for the region of the CAR. The deciding may then for instance be performed for all regions of a CAR based on information on respectively detected negative hits.

The example embodiment of the method according to the invention may, according to its first aspect, for instance further comprise removing or triggering removing of the region of the CAR from the CAR (e.g. by deleting or no longer storing a related data entry in a database that stores the CAR or a representation thereof), if it has been decided that this region shall be removed. For instance, a link between the region of the CAR and an identifier of the coverage area that is associated with the CAR may be removed. When a region is removed from a CAR, also further stored information pertaining to this region (such as for instance receive (Rx) level samples of signals received in this region (and reported in fingerprints)) may be removed.

The example embodiment of the method according to the invention may, according to its first aspect, for instance further comprise increasing a negative hit counter maintained for the region of the CAR if a negative hit for the region of the CAR is detected, wherein the information on the detected negative hit is the negative hit counter. The negative hit counter may thus accumulate detections of negative hit for the region of the coverage area over time. The negative hit counter counts negative hits, for instance in the form of a integer number that starts from zero and is incremented by one each time the conditions (i)-(iii) are met. It is maintained for at least the region of the CAR. If the CAR has several regions, for instance respective negative hit counters may be provided for some or all of these regions. The negative hit counter is increased if at least all of the conditions (i)-(iii) hold. It is for instance only increased if at least all of the conditions (i)-(iii) hold. When the negative hit counter exceeds a pre-defined or (e.g. adaptively) determined threshold, for instance the deciding if the region shall be removed from the CAR may be triggered. Alternatively, the negative hit counter may be analyzed after a pre-defined or (e.g. adaptively) determined time period has lapsed. The negative hit counter may then for instance be reset to zero again.

The example embodiment of the method according to the invention may, according to its first aspect, for instance further comprise detecting a positive hit for the region of the CAR, (only) if at least all of the following conditions (i)-(ii) hold:
(i) the position of the terminal comprised in the detection data is within the region and
(ii) the detection data comprises the identifier related to the coverage area associated with the CAR, at least information on at least one of the detected positive hit and the detected negative hit used and/or provided for the deciding if the region of the CAR shall remain part of the CAR or shall be removed from the CAR.

A positive hit is an event where a position of a terminal is reported (by means of the detection data) together with an identifier of the coverage area associated with the CAR having the region for which the positive hit counter is maintained and where the position of the terminal is within the region of the CAR. A positive hit in a region of a CAR thus gives an indication that the region of the CAR is still up-to-date.

Both information on the detected positive hit and on the detected negative hit can be used (for instance together with further parameters such as for instance a pre-defined threshold, and/or information on detected negative hits and/or detected positive hits from neighbouring regions), for instance after a pre-defined time interval has lapsed and/or if a number of negative hits has exceeded a pre-defined threshold (to allow a quick reaction to changes in the coverage area), to decide if the region of the CAR shall remain part of the CAR (i.e. is up-to-date) or shall be removed (i.e. is out-dated). Therein, the detection of positive hit may be considered as a kind of counter balance for the detection of negative hits. It may for instance prevent a removal of a region for which only a few negative hits, but a larger number of positive hits have been received, since it is then clear that the negative hits are highly likely to be erroneous. Such erroneous negative hits may for instance occur when a terminal is capable of detecting only a limited number of coverage areas at a time (e.g. of the same class, for instance only 6 GSM coverage areas, although 8 would be detectable by a terminal without this limitation). Also holes in a coverage area (for instance if not reflected by the CAR (e.g. in case of an elliptical model)) may lead to erroneous negative hits (due to physical reasons, since it is may then be impossible to detect a coverage area).

The example embodiment of the method according to the invention may, according to its first aspect, for instance further comprise increasing a positive hit counter maintained for the region of the CAR if a positive hit for the region of the CAR is detected, at least the positive hit counter and the negative hit counter being used and/or provided for the deciding if the region of the CAR shall remain part of the CAR or shall be removed from the CAR.

Therein, it may for instance be decided (in the deciding) that the region shall be removed from the CAR if the negative hit counter is larger than the positive hit counter or if a difference between or a ratio of the negative hit counter and the positive hit counter exceeds a pre-defined or a determined threshold. As stated above, this deciding may for instance be performed after a pre-defined time period has lapsed, or when the negative hit counter exceeds a pre-defined threshold value, to name but a few examples. To prevent that a positive hit counter is increased for a region which is not (anymore) covered by the coverage area associated with the CAR, it may also be advantageous to decide if the region of the CAR shall remain part of the CAR or shall be removed from the CAR before detecting of a positive (and/or negative) hit is performed for the (currently) obtained and/or generated detection data. For instance, the deciding may be performed based on previously obtained and/or generated detection data.

In the example embodiment of the method according to the invention, the deciding may be performed after a determined time period has lapsed and/or when the negative hit counter exceeds a determined threshold value. The determined time period and/or the determined threshold value may for instance be pre-defined and/or adaptively determined. For instance, the time period and/or the threshold value may be adapted based on information on the state of the CAR such as a frequency according to which detection data are generated and/or obtained for at least a region of the CAR. The deciding may also be triggered, for instance by generating and/or obtaining detection data as described above.

The example embodiment of the method according to the invention may for instance further comprise determining, based on the detection data (for instance only or particularly based on the position data therein) and on a database that comprises information on a plurality of CARs and information on their associated coverage areas, a first set of one or more coverage areas that at least comprises the coverage area associated with the CAR that has the region (for which the negative or positive hits are detected, if the respective conditions are fulfilled). The database may for instance comprise information on the plurality of CARs and respective identifiers of the coverage areas that are associated with the CARs. As described above, the database may for instance store identifiers of all regions of a grid of regions and for each region of this grid of regions a list of one or more identifiers of the respective coverage areas that are respectively associated with the CARs that comprise this region. This set of one or more coverage areas at least comprises the CAR that has the region for which the detecting of the negative hit (or the positive hit) is performed. The determining of the first set of one or more coverage areas may for instance take place prior to the detecting of the negative hit (or the positive hit).

The first set of one or more coverage areas may for instance be determined to comprise each coverage area that (i) is associated with a CAR comprised in the database and covering the position of the terminal and (ii) has a class that matches at least one class of the one or more coverage areas for which respective identifiers are comprised or at least expected to be comprised in the detection data. If the CARs are stored in the database based on a grid of regions, the first set of one or more coverage areas may for instance be determined by identifying, from the database, all coverage areas from the database that have a matching coverage area class with respect to the coverage area class at least expected in the detection data and further have respectively associated CARs containing a region (from the grid of regions) that comprises the position of the terminal indicated in the detection data. This region may then already be the region for which the negative hit (or the positive hit) is detected, if the respective conditions hold. Here, the grid of regions used for storing the plurality of CARs in the database is thus the same as the grid of regions containing the region for which the negative hit (or the positive hit) is detected (this is however not necessarily the case, as will be described in more detail below).

In case that the negative hit is detected for the region of the CAR, the CAR is associated with a coverage area of the first set of coverage areas for which it has been checked that no respectively related identifier is comprised in the detection data. Thus, when the first set of coverage areas has been determined, the coverage area(s) respectively associated with CAR(s) that has/have a region (which region is—if the CARs are stored in the database based on a grid of regions— also already known from the determining of the first set of one or more coverage areas) for which respective negative hits should be checked is/are identified from the first set of one or more coverage areas by simply excluding those coverage areas that has/have not been identified in the detection data.

In case that also positive hits are checked for in addition to negative hits, in case that the positive hit is detected for the region of the CAR, the CAR is associated with a coverage area of the first set of coverage areas for which it has been checked that a respectively related identifier is comprised in the detection data. Thus the first set of one or more coverage areas can be used as a basis for checking whether the positive hit or the negative hit is detected.

Alternatively, the first set of one or more coverage areas may for instance be determined to comprise each coverage area that is associated with a CAR comprised in the database and covering, when represented with a first granularity, the position of the terminal and has a class that matches at least one class of the one or more coverage areas for which respective identifiers are comprised or at least expected to be comprised in the detection data, wherein in case that the negative hit is detected for the region of the CAR, the CAR is then associated with a coverage area of the first set of coverage areas for which it has been checked that no respectively related identifier is comprised in the detection data and that it is associated with a CAR that, when represented with a second granularity that is finer than the first granularity, still covers the position of the terminal Here, thus the first set of one or more coverage areas is determined based on a first-granularity representation of the CARs (which is for instance based on a grid of regions with a first granularity, which may for instance be defined by the dimensions of the regions of the grid of regions). From this first set of one or more coverage areas, then the coverage areas are excluded that are identified in the detection data. Subsequently, for the remaining coverage area(s), it is then checked based on a second-granularity representation of the CAR(s) respectively associated with the remaining coverage area(s) if it/they still contain the position of the terminal. This yields all CARs having a region for which a negative hit should be detected. The second-granularity representation of the CAR(s) is for instance based on a grid of regions with a second granularity that is finer than the first granularity, with the granularity for instance again being defined by the dimensions of the regions of this grid of regions. The second-granularity representation of the CAR(s) may for instance also relate to the case that the determining is based on the CAR itself such that the second-granularity representation of the CAR(s) corresponds to the CAR (e.g. equals the CAR).

Using a first granularity that is coarser than the second granularity may reduce the initial computational complexity of determining the first set of one or more coverage areas, which may be considerate in case of several CARs. For the (usually few) coverage areas in the first set of one or more coverage areas, which can be further reduced by excluding those coverage areas that have been identified in the detection data, then a checking based on the second granularity with a higher computational complexity can be applied, still resulting in an overall vastly reduced computational complexity.

In case that also positive hits are checked for in addition to negative hits, in case that the positive hit is detected for the region of the CAR, the CAR is then associated with a coverage area of the first set of coverage areas for which it has been checked that a respectively related identifier is comprised in the detection data and that it is associated with a CAR that, when represented with the second granularity, still covers the position of the terminal. If the position of the terminal should no longer be within the CAR, for instance an outlier processing may be performed.

Furthermore, the region of the CAR (for which the negative hit is detected) may for instance be formed based on the second granularity. Thus the region for which the negative hit (or the positive hit) is detected may be taken from a grid of regions that has a second granularity (which may be understood as an "activity detection grid"). Thus when checking based on the second-granularity representation of the CAR(s) respectively associated with the remaining coverage area(s) if it/they still contain the position of the terminal, the region (of the "activity detection grid") for which the negative hit is to be detected is obtained—as a by-product-as the region that comprises the position of the terminal.

The second granularity may for instance be an integer multiple of the first granularity. Additionally or alternatively, the grid of regions with the first granularity and the grid of regions with the second granularity may be aligned. Thus for instance, if the integer multiple is n, each region of the grid of regions with the first granularity may comprise n regions of the grid of regions with the second granularity.

In the example embodiment of the method according to the invention, the region may for instance be a quadrant of a grid of quadrants obtainable by dividing a longitude axis and a latitude axis of the Earth into a plurality of quadrants of size x times y degrees, wherein x and y are real numbers. The numbers x and y may for instance be the same, yielding square regions/quadrants. The numbers x and y may for instance represented by an integer division factor that may for instance range from 1 to 100, corresponding to resolutions (in case of x=y) of 0.01 by 0.01 degrees to 1 by 1 degrees, respectively. The numbers x and y may for instance be fixed (at least with respect to a database in which all of the objects are stored), but may equally well be dynamically adjusted.

According to the second aspect of the example embodiment of a method according to the invention, at least information on the detected negative hit is alternatively or additionally (with respect to being used and/or provided for deciding if the region of the overage area representation shall remain part of the CAR or shall be removed from the CAR) used and/or provided for deciding whether a frequency of generating detection data shall be increased.

The example embodiment of the method according to the invention may, according to its second aspect, then for instance further comprise increasing or triggering increasing of the frequency of generating detection data.

In this second aspect, thus a negative hit is detected (e.g based on the detection data (e.g. a fingerprint) and on the database) if the conditions (i)-(iii) hold. At least based on information on the detected negative hit, it is decided whether a frequency of generating detection data (for instance at least by the terminal) shall be increased. For instance, it may be decided to increase the frequency of generating the detection data if only a single negative hit occurs, or to increase the frequency of generating the detection data if a pre-defined or (e.g. adaptively) determined number of negative hits has been reached or exceeded.

Therein, each detection data generated (i.e. also the detection data generated when the frequency of generating of the detection data is increased) may for instance be understood to comprise a refreshed (e.g. current) position of the terminal and a refreshed set of identifiers of the coverage areas that are (e.g. currently) detected by the terminal). A rationale for increasing the frequency of generating the detection data (which corresponds to an increase of the number of detection data or fingerprints produced in a given time interval) in case of one or more negative hits may for instance be that by increasing the frequency, an entity that analyzes the detection data (such as a server, for instance a server that implements the example embodiment of a method according to the invention) to decide if the CAR (or a region thereof) is outdated, is provided with information concerning a potentially outdated CAR (or a region thereof) more quickly. I.e. within a given time interval, more information on this potentially outdated CAR may then be provided. The CAR may thus be updated more quickly and/or potentially erroneously reported negative hits may be detected more quickly. The frequency of the generating of the detection data may be decreased again (for instance set to a default value), for instance after a pre-determined time period has lapsed after the increase of the frequency, or for instance in response to a control signal of the entity that that analyzes the detection data to decide if the CAR (or a region thereof) is outdated.

In this second aspect, the generating (or obtaining) of the detection data, the detecting of the negative hit and the deciding whether a frequency of generating detection data shall be increased may for instance be performed by the terminal that generates the detection data (based on a determination of its position and of the coverage areas it can detect). Alternatively, the obtaining of the detection data, the detecting of the negative hit and the deciding whether a frequency of generating detection data shall be increased may for instance be performed by a server that obtains the detection data generated by the terminal (e.g. directly or indirectly from the terminal). In case it is decided to increase the frequency of generating the detection data, an according control signal may for instance be sent at least to the terminal. This control signal may for instance also be sent to further terminals that are in the neighbourhood of the terminal, for instance within a pre-defined range around the terminal Involving also further terminals that are different from the terminal that generated the detection data on which the decision to increase the frequency is at least partially based contributes to increasing the amount of detection data available around the position of the terminal and is furthermore advantageous in a case when the terminal is (e.g. temporally) defect and thus produces erroneous detection data. The impact of such erroneous detection data is then mitigated by the correct detection data from the further terminals.

Furthermore, the following shall be understood to be disclosed:
(1) An example embodiment of an apparatus according to the invention that is configured to perform or comprises respective means for performing at least the respective operations or method steps of the example embodiment of the method according to the invention (either with or without some or all of its optional features in all possible combinations) as presented above. The means of this apparatus can be implemented in hardware and/or software. They may comprise for instance a processor for executing program code for realizing the required functions, a memory storing the program code, or both. Alternatively, they could comprise for instance a circuitry that is designed to realize the required functions, for instance implemented in a chipset or a chip, like an integrated circuit. Further alternatively, the means could be functional modules of a computer program code.
(2) An example embodiment of an apparatus according to the invention that comprises at least one processor and at least one memory including computer program code, the at least one memory and the computer program code configured to, with the at least one processor, cause the apparatus at least to perform the operations of the example embodiment of the method according to the invention (either with or without some or all of its optional features in all possible combinations) presented above. The computer program code included in the memory may for instance at least partially represent software and/or firmware for the processor. Non-limiting examples of the memory are a RAM or ROM that is accessible by the processor.

(3) An example embodiment of a computer program according to the invention that comprises respective program code for performing at least the operations of the example embodiment of the method according to the invention (either with or without some or all of its optional features in all possible combinations) presented above when the computer program is executed on a processor. The computer program may for instance be stored on a computer-readable storage medium, which may for instance be a tangible storage medium.

The example embodiments of apparatuses according to invention may further comprise at least one of a user interface, an antenna and communication network interface. The example embodiment of an apparatus according the invention may for instance be the terminal that generates the detection data pertains or a server that obtains the detection data.

An example embodiment of a system according to the invention comprises an apparatus according to the invention (e.g. a server) and one or more terminals. One or more of the terminals may for instance be embodied as respective apparatuses according to the second aspect of the invention.

The example embodiments of the method, apparatus, computer program and system according to the invention presented above and their single features shall be understood to be disclosed also in all possible combinations with each other.

Further, it is to be understood that the presentation of the invention in this section is based on example non-limiting embodiments.

Other features of the invention will be apparent from and elucidated with reference to the detailed description presented hereinafter in conjunction with the accompanying drawings. It is to be understood, however, that the drawings are designed solely for purposes of illustration and not as a definition of the limits of the invention, for which reference should be made to the appended claims. It should further be understood that the drawings are not drawn to scale and that they are merely intended to conceptually illustrate the structures and procedures described therein. In particular, presence of features in the drawings should not be considered to render these features mandatory for the invention.

DETAILED DESCRIPTION OF EMBODIMENTS OF THE INVENTION

Figure 1A:
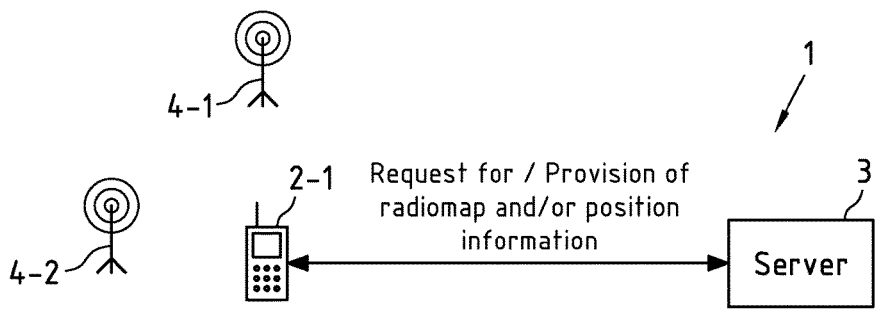
FIGS. 1a to 1b: an example embodiment of a system according to the invention.

Satellite positioning does not work well indoors or in other shadowed environments. However, various fixed CPEs are ubiquitous in the modern world. Examples include cellular base stations (GSM, WCDMA, TD-SCDMA, LTE, LTE-A, CDMA/CDMA2000), WLAN access points, FM radio or TV stations. These signals have good penetration and coverage virtually everywhere of interest. Thus they are well-suited to complement or substitute satellite-based positioning methods.

Positioning based on, say, cellular base stations is based on databases (a.k.a radiomap databases) that carry various information on coverage areas/cells/access points. The simplest such information is location information of the coverage area/cell with some estimate of the uncertainty associated with the location information. More elaborate databases may carry base station coordinates, antenna information (azimuth, beam width, range, Tx power, etc.) and, for instance, information on the coverage area and Rx levels in the coverage area for high precision positioning.

The database build-up is typically a community-based effort in which willing consumers map coverage areas with AGNSS-enabled mobile terminals. The process is continuous in a sense that the coverage area environment is continuously under change—the coverage areas may move from one place to another (network re-planning), CPE Tx power may change or the antenna properties (azimuth, beam width) may change. Thus new sample data must be fed into the learning system all the time and the database is constantly under change.

It is the nature of communication networks that they change when more capacity is added or hardware is renewed. Moreover, some fine tuning of the network constantly takes place e.g. in cellular networks (Tx power changes etc.). In practice this means that companies collecting network data must detect these changes in the network without getting any kind info about the change from the operator or the CPE owner. Thus noticing and adjusting to the changes in the network plan and keeping the database of access points, base stations and beacons up-to-date is very challenging in the global community-collected radio positioning service.

Data collection systems may comparably easily notice when the size of a coverage area grows. But it is difficult to notice when the coverage areas gets smaller (e.g. due to transmit power reduction), moves because of radio network re-planning (Cell IDs reassigned in the network) or the serving area changes due to antenna re-direction (change in the antenna pattern or physically turning the antenna).

Example embodiments of the present invention disclose how to update the radiomap in cases when a coverage area gets smaller or changes in some other way by small amount inside of the coverage area's theoretical maximum size. It is kept track of the activity in different parts of the coverage area over time in order to de-learn non-active parts/regions of the coverage area in case of a change in the coverage area characteristics. In example embodiments of the invention, this can for instance be accomplished by keeping track of activity in different parts of the coverage area over time with the help of positive and negative hit counters. A positive hit counter in a given region within the coverage area gets increased, when the coverage area is observed within the region during a certain period of time. A negative hit counter in a given region within the coverage area gets increased, when the coverage area is not observed within the region during a certain period of time although it was previously observed in the region. What was "previously observed" in the area can be known based on the collected radiomap database. It is furthermore analysed, if in a given region, the balance of positive and negative hits during a period of time. In case the region has only negative hits (but overall there has been positive activity in the coverage area, i.e. the coverage area is still there), it is evident that the coverage area no longer exists in the region and the coverage area parameters in the radiomap database can be adjusted accordingly.

Figure 1B:
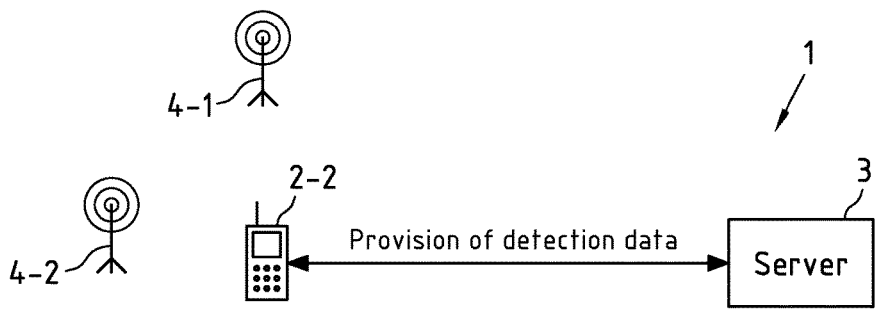

FIGS. 1*a* and 1*b* depict an example embodiment of a system 1 according to the invention. FIG. 1*a* relates to a consumer mode of system 1, and FIG. 1*b* relates to a collector mode thereof.

System 1 comprises a terminal 2-1 or 2-2 and a server 3. Server 3 comprises or has access (for instance via a network, which is not shown in FIGS. 1*a* and 1*b*) to a radiomap database. In the radiomap database, information on a plurality of coverage area representations (CARs) is stored. For instance, information on CARs associated with coverage areas provided by coverage providing entities (CPEs) 4-1 and 4-2 are stored in the radiomap database. For instance, the plurality of CARs and identifiers related to the coverage areas associated with the CARs of the plurality of CARs may be stored in the radiomap database. As described above, a CAR for instance desires to be representative of a coverage area associated therewith, but at least temporary deviations may occur between the CAR and the coverage. Furthermore, a CAR may only be a coarse model of the coverage area associated therewith, for instance an elliptical model or a polygon.

In the consumer mode of system 1 (i.e. FIG. 1*a*), a position of a consumer terminal such as terminal 2-1 may be determined based on one or more coverage areas detected by the terminal at its position and the radiomap database. In the collector mode of system 1 (i.e. FIG. 1*b*), the radiomap database is updated by detection data received from a collector terminal such as terminal 2-2. A terminal hearing a coverage area may be understood such that the terminal detects the coverage area as described above. For instance, the terminal may then be able to "hear" (i.e. receive one or more signals which are sent by) a CPE providing the coverage area such as CPEs 4-1 and 4-2. Consumer terminal 2-1 and collector terminal 2-2 are capable of operating in one or more wireless communication systems (CSs), which may for instance be of a cellular or non-cellular type. Terminals 2-1 and 2-2 may denote different terminals, but may also be combined in a single terminal which is used as a consumer terminal in the embodiment of FIG. 1*a* and as a collector terminal in the embodiment of FIG. 1*b*.

In an example of a scenario of system 1, terminals 2-1 and 2-2 may for instance (currently) detect the coverage areas provided by CPEs 4-1 and 4-2 which are of the same class of coverage areas. For instance, the CPEs 4-1 and 4-2 are operated according to the same CS and owned by the same operator.

Information exchange between terminal 2-1 or terminal 2-2 and server 3 is based on a CS (either of wired or wireless type), which may for instance be the CSs according to which CPEs 4-1 and 4-2 are operated, but may equally well be a different CS.

In FIG. 1*a*, the position of consumer terminal 2-1 may for instance have to be determined at least partially based on CAR information stored in the radiomap database. For instance, terminal 2-1 may determine its position in a terminal-based manner based at least on radiomap information requested from and provided by server 3. For instance, terminal 2-1 locally stores at least a partial copy of the radiomap database such that the terminal 2-1 can determine its (current) position locally at least partially based on the local copy of the radiomap database and on CPEs 4-1 and 4-2 which terminal 2-1 (currently) hears. Alternatively or additionally, terminal 2-1 may request position information from server 3. For instance, terminal 2-1 may provide a so-called fingerprint for instance comprising identifiers of CPEs 4-1 and 4-2 which terminal 2-1 (currently) hears to server 3. At least partially based on the radiomap database and the fingerprint, server 3 may then determine the (current) position of terminal 2-1 and provide corresponding position information to terminal 2-1. This allows reducing the complexity and power consumption of consumer terminal 2-1.

In FIG. 1*b*, collector terminal 2-2 collects information based on which the CAR information stored in the radiomap database is maintained and/or updated. Terminal 2-2 may be capable of determining its (current) position, for instance based on a (Assisted) Global Navigation Satellite System (A)GNSS receiver attached to or integrated in terminal 2-2. For instance, terminal 2-2 may alternatively/additionally be capable of determining its (current) position in a terminal based manner, for instance at least partially based on a local copy of a radiomap database and on CPEs different from CPEs 4-1 and 4-2 (e.g. CPEs operated according to a different CS) which terminal 2-2 (currently) hears. For instance, terminal 2-2 may determine its position based on WLAN CPEs/coverage areas, and may report this determined position with a list of currently detected coverage areas of another (e.g. cellular) CS. For instance, collector terminal 2-2 may provide detection data comprising the current position of terminal 2-2 and the identifiers of CPEs 4-1 and 4-2 providing coverage areas currently detected at that position to server 3. Based on this detection data, server 3 may update and/or maintain the radiomap database.

Figure 2:
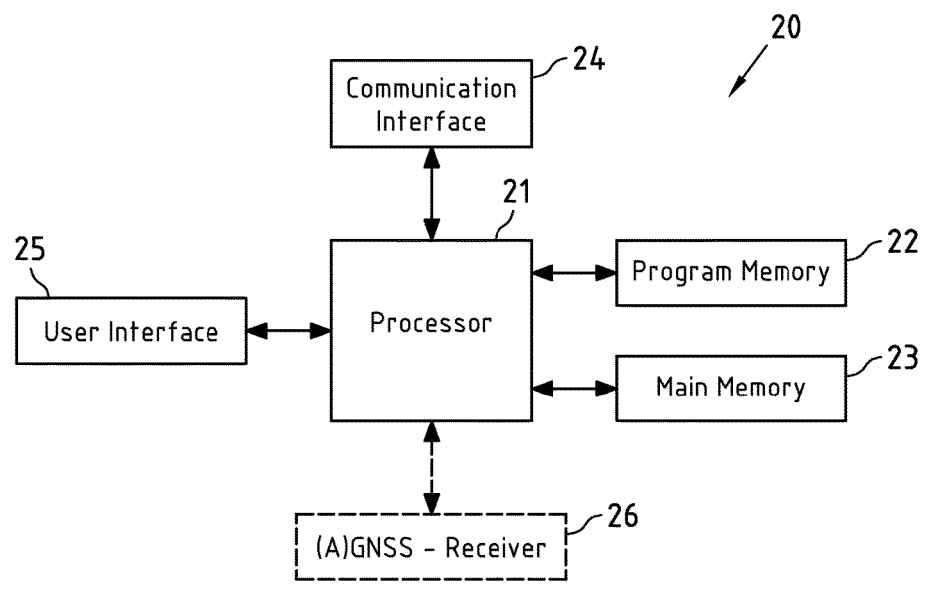
FIG. 2: a schematic block diagram of an example embodiment of an apparatus according to the invention, which is or forms a part of a terminal.

FIG. 2 is a schematic block diagram of an example embodiment of an apparatus 20 according to the invention. Apparatus 20 is or forms a part of consumer terminal 2-1 and/or collector terminal 2-2 of system 1 (see FIGS. 1*a* and 1*b*).

Apparatus 20 comprises a processor 21, which may for instance be embodied as a microprocessor, Digital Signal Processor (DSP) or Application Specific Integrated Circuit (ASIC), to name but a few non-limiting examples. Processor 21 executes a program code stored in program memory 22 (for instance program code implementing one or more of the embodiments of a method according to the invention described below with reference to FIGS. 5, 6a, 6b, 7 and 8), and interfaces with a main memory 23, which may for instance store a local copy of the radiomap database (or at least a part thereof). Some or all of memories 22 and 23 may also be included into processor 21. Memories 22 and/or 23 may for instance be embodied as Read-Only Memory (ROM), Random Access Memory (RAM), to name but a few non-limiting examples. One of or both of memories 22 and 23 may be fixedly connected to processor 21 or removable from processor 21, for instance in the form of a memory card or stick.

Processor 21 further controls a communication interface 24 configured to receive and/or output information. For instance, communication interface 24 may be configured to exchange information with server 3 of system 1 (see FIGS. 1a and 1b). This may for instance comprise sending requests and/or detection data to server 3 and/or receiving radiomap and/or position information from server 3. This communication may for instance be based on a wire-bound or wireless connection. Communication interface 24 may thus for instance comprise circuitry such as modulators, filters, mixers, switches and/or one or more antennas to allow transmission and/or reception of signals. In embodiments of the invention, communication interface 24 is configured to allow communication according to a 2G/3G/4G cellular CS and/or a WLAN.

Processor 21 further controls a user interface 25 configured to present information to a user of apparatus 20 and/or to receive information from such a user. Such information may for instance comprise information on a position determined by positioning based on detected coverage areas and according radiomap information. User interface 25 may for instance be the standard user interface via which a user of entities 1 or 2 interacts with terminal 2-1 and/or terminal 2-2 to control other functionality thereof, such as making phone calls, browsing the Internet, etc.

Processor 21 may further control an optional (A)GNSS-receiver 26 configured to receive positioning information of a (A)GNSS such as Global Positioning System (GPS), Galileo, Global Navigation Satellite System (i.e. "Globalnaja Nawigazionnaja Sputnikowaja Sistema", GLONASS) and Quasi-Zenith Satellite System (QZSS). Based on received positioning information the current position of the apparatus may be determined Optional (A)GNSS-receiver 26 may be attached to or integrated in apparatus 20. Collector terminal 2-2 comprises (A)GNSS-receiver 26, whereas consumer terminal 2-1 may not comprise (A)GNSS-receiver 26.

Figure 3:
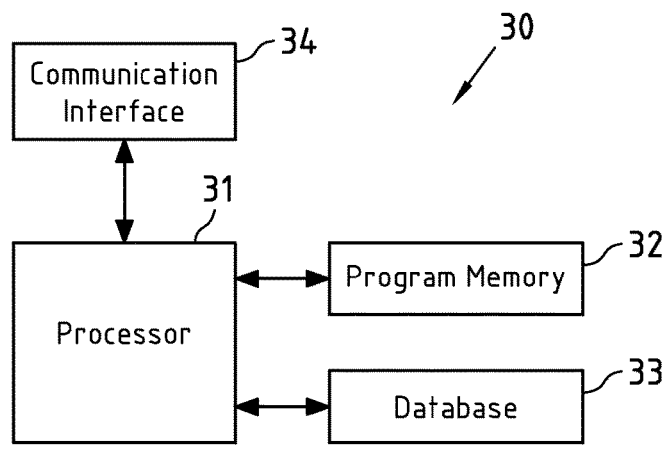
FIG. 3: a schematic block diagram of an example embodiment of an apparatus according to the invention, which is or forms a part of a server.

FIG. 3 is a schematic block diagram of an example embodiment of an apparatus 30 according to the invention. Apparatus 30 is or forms a part of server 3 of system 1 (see FIGS. 1a and 1b).

Apparatus 30 comprises a processor 31, which may for instance be embodied as a microprocessor, Digital Signal Processor (DSP) or Application Specific Integrated Circuit (ASIC), to name but a few non-limiting examples. Processor 31 executes a program code stored in program memory 32 (for instance program code implementing one or more of the example embodiments of a method according to the invention described below with reference to FIGS. 5, 6a, 6b, 7 and 8). Processor 31 further interfaces with a radiomap database 33, which may for instance store a radiomap with information on CARs such as CARs associated with coverage areas provided by CPEs 4-1 and 4-2 as described above. An example of the structure of radiomap database 33 is described below with respect to FIG. 9a.

Memory 32 may also be included into processor 31. Memory 32 may for instance be embodied as Read-Only Memory (ROM) or Random Access Memory (RAM), to name but a few non-limiting examples. Memory 32 may be fixedly connected to processor 31 or removable from processor 31, for instance in the form of a memory card or stick. Radiomap database 33 may for instance be embodied as mass storage device, for instance with capacities of several Gigabytes or several Terabytes. It may either be fixedly connected to processor 31, or may be releasably connectable thereto.

Processor 31 further controls a communication interface 34 configured to receive and/or output information. For instance, communication interface 34 may be configured to exchange information with consumer terminal 2-1 and/or collector terminal 2-2 of system 1 (see FIGS. 1a and 1b). This may for instance comprise receiving requests from consumer terminal 2-1 and providing radiomap and/or position information to terminal 2-1, receiving detection data from collector terminal 2-2 and/or sending control signals to collector terminal 2-2. This communication may for instance be based on a wire-bound or wireless connection. Communication interface 34 may thus for instance comprise circuitry such as modulators, filters, mixers, switches and/or one or more antennas to allow transmission and/or reception of signals. In embodiments of the invention, communication interface 34 is configured to allow communication according to a 2G/3G/4G cellular CS and/or a WLAN.

It is to be noted that the circuitry formed by the components of apparatuses 20 and 30 may be implemented in hardware alone, partially in hardware and in software, or in software only, as further described at the end of this specification.

Figure 4:
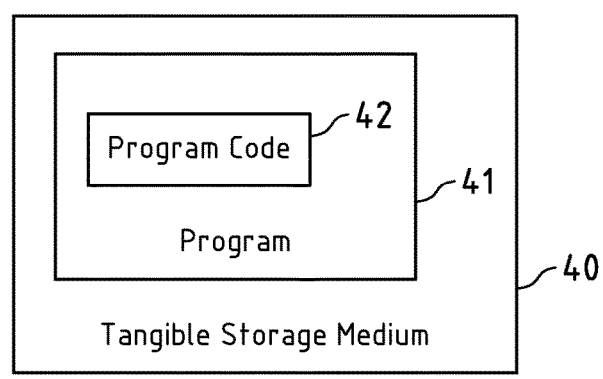
FIG. 4: a schematic illustration of an example embodiment of a tangible storage medium according to the invention.

FIG. 4 is a schematic illustration of an embodiment of a tangible storage medium 40 according to the invention. This tangible storage medium 40, which may in particular be a non-transitory storage medium, comprises a program 41, which in turn comprises program code 42 (for instance a set of instructions). Realizations of tangible storage medium 40 may for instance be program memories 22 and 32 of FIGS. 2 and 3. Consequently, program code 42 may for instance implement the flowcharts of FIGS. 5, 6a, 6b, 7 and 8 discussed below.

In the following, FIGS. 5, 6a, 6b, 7 and 8 are described relating to flowcharts of example embodiments of the invention. For illustrative purposes only and without limiting the scope of the invention, it is assumed that the steps of the flowcharts of FIGS. 5, 6a, 6b, 7 and 8 are performed by server 3 and/or collector terminal 2-2 of system 1 (see FIGS. 1a and 1b). A step performed by server 3 (and/or terminal 2-2, respectively) may preferably be understood such that corresponding program code is stored in memory 32 (and/or memory 22, respectively) and that the program code and the memory are configured to, with processor 31 (and/or processor 21, respectively), cause server 3 (and/or terminal 2-2, respectively) to perform the step.

Figure 5:
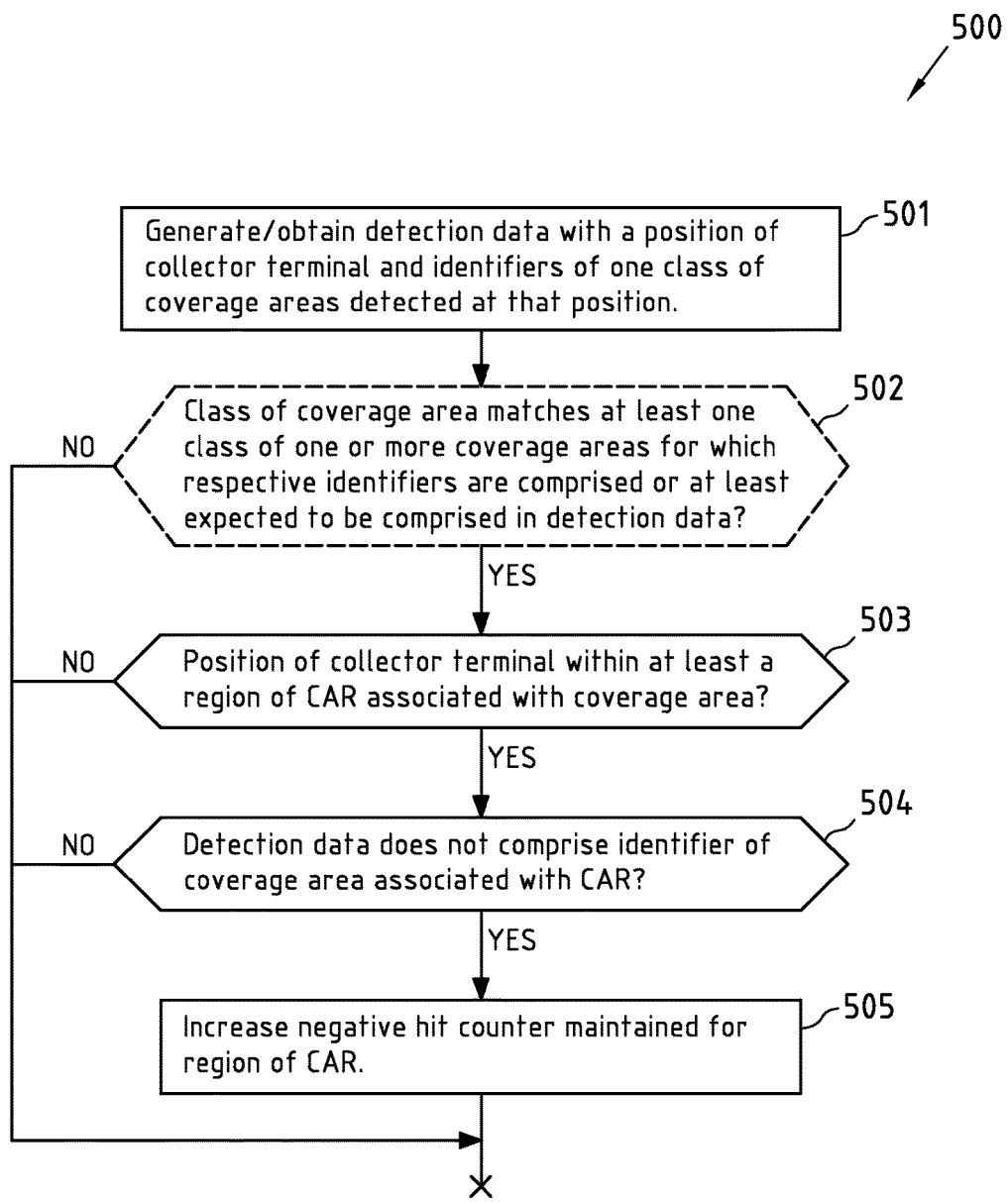
FIG. 5: a flowchart of an example embodiment of a method according to the invention.

FIG. 5 is a flowchart 500 of an exemplary embodiment of a method according to the invention. Flowchart 500 basically relates to maintaining a negative hit counter at least for a region of each CAR on which information is stored in radiomap database 33 (e.g. based on previously obtained and analysed detection data).

In step 501, detection data with a position of collector terminal 2-2 and identifiers of one class of coverage areas detected at that position are generated and/or obtained. Generating detection data may be understood such that collector terminal 2-2 generates the detection data by determining its current position based on positioning information received at (A)GNSS-receiver 26 and by determining the identifiers related to the coverage areas currently detected at communication interface 24 at that position. Collector terminal 2-2 may generate the detection data with a variable frequency. Obtaining detection data may be understood such that detection data generated by terminal 2-2 are received at server 3 at communication interface 34.

In optional step 502 (as indicated by the dashed frame), it is determined for a coverage area whether the class of the coverage area matches at least one class of one or more coverage areas for which respective identifiers are comprised or at least expected to be comprised in the detection data. The coverage area may for instance be any coverage area associated with a CAR of the plurality of CARs stored in radiomap database 33 of server 3. For instance, steps 502 to 505 may be iteratively performed for each coverage area associated with a CAR stored in radiomap database 33.

In step 502, server 3 may thus for instance explicitly check whether the coverage area relates to the same CS and the same operator as the coverage areas provided by CPEs 4-1 and 4-2. However, step 502 is only optional and may for instance be dispensable, for instance if only information on CARs associated with coverage areas related to the same class of coverage areas are stored in radiomap database 33.

If it is determined that the class of the coverage area matches the at least one class present or expected to be in the detection data, flowchart 500 proceeds to step 503. Otherwise flowchart 500 is terminated at least for the present coverage area and steps 502-505 may be iterated for another coverage area associated with another CAR stored in radiomap database 33.

In step 503, it is determined whether the position of the collector terminal is within at least a region of a CAR associated with the coverage area. For instance, it is determined whether the position of collector terminal 2-2 comprised in the received detection data is covered by the CAR associated with the coverage area and/or by a region of the CAR. The region of the CAR may equal the CAR. Alternatively, the region of the CAR may be one of a plurality of regions of the CAR. For instance, the region may be part of a grid of regions, for instance a grid with rectangular, triangular and/or hexagonal regions. Preferably, the region may be part of an activity grid of regions as exemplary described below with respect to FIG. 10.

If it is determined that the position of the collector terminal is within at least a region of a CAR associated with the coverage area, flowchart 500 proceeds to step 504. Otherwise flowchart 500 is terminated at least for the present coverage area and steps 502-505 may be iterated for another coverage area associated with another CAR stored in radiomap database 33.

In step 504, it is determined whether the detection data does not comprise an identifier related to the coverage area associated with the CAR. If it is determined that the detection data does not comprise an identifier related to the coverage area associated with the CAR, flowchart 500 proceeds to step 505. Otherwise flowchart 500 is terminated at least for the present coverage area and steps 502-505 may be iterated for another coverage area associated with another CAR stored in radiomap database 33.

Steps 501-504 relate to detecting a negative hit at least for a region of a CAR. Therein, step 505 of flowchart 500 is only performed, if a negative hit for at least a region of the CAR is detected. In step 505, a negative hit counter maintained for the region of the CAR is accordingly increased. For instance, for each region of a CAR stored in radiomap database 33, a respective negative hit counter may be stored in radiomap database 33. In case that the region equals the CAR, only a single negative hit counter may be stored in radiomap database 33 for the CAR. Having only one negative hit counter per CAR may for instance be sufficient in case of small coverage areas such as for instance in case of low-range CSs (e.g. Bluetooth or NFC).

The steps of flowchart 500 may for instance at least partially be performed by collector terminal 2-2. For instance, steps 501-504 may be performed by collector terminal 2-2 at least partially based on a local copy of radiomap database 33 stored in memory 22 of collector terminal 2-2, and step may 505 may be performed by server 3 which may for instance receive an according instruction from terminal 2-2. Alternatively, the steps of flowchart 500 may for instance be entirely performed by server 3.

Figure 6A:
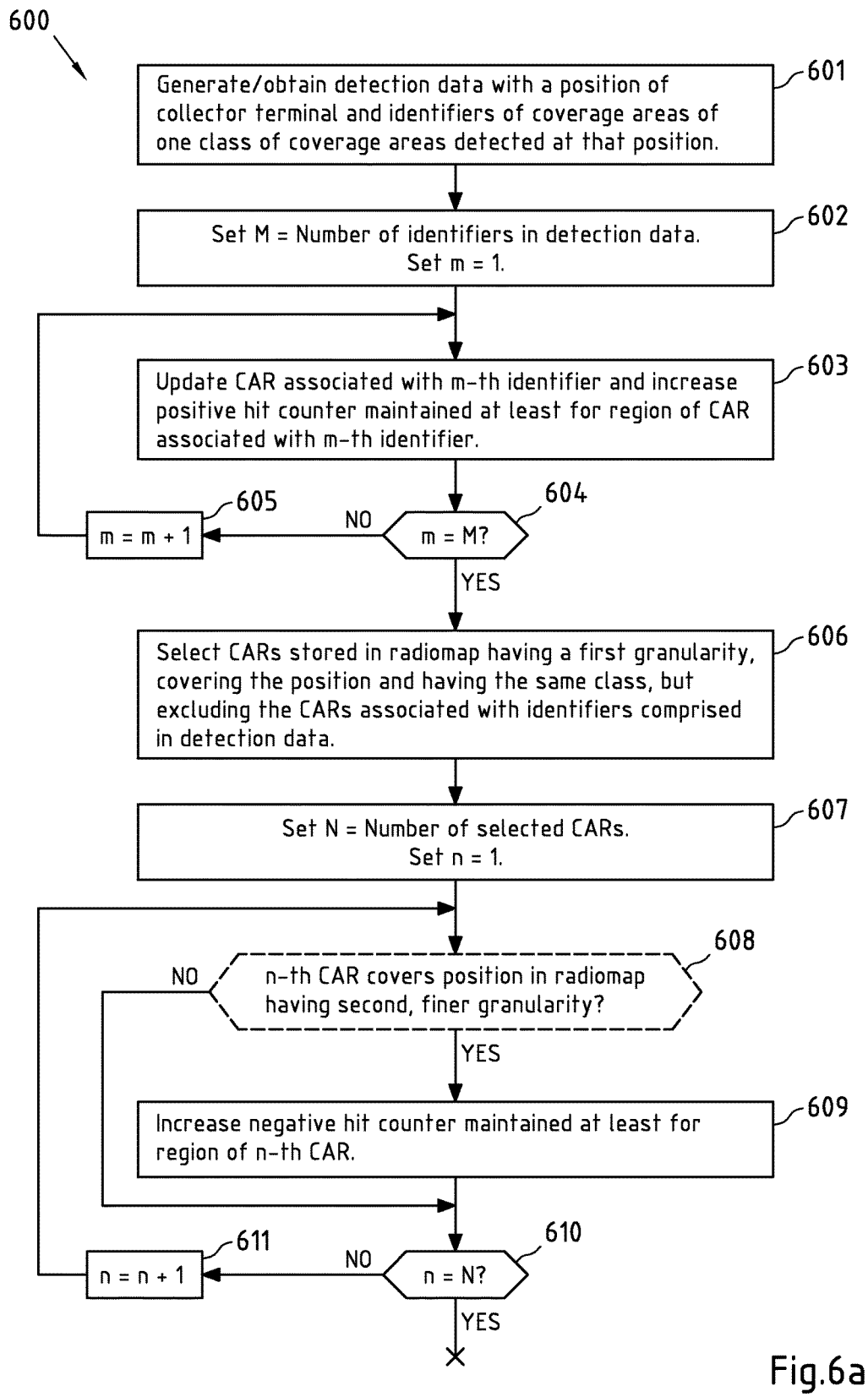
FIG. 6a: a flowchart of an example embodiment of a method according to the invention.

FIG. 6a is a flowchart 600 of an example embodiment of a method according to the invention. Flowchart 600 basically relates to maintaining negative and positive hit counters at least for a region of each CAR on which information is stored in radiomap database 33 (e.g. based on previously obtained and analysed detection data).

In step 601, detection data with a position of collector terminal 2-2 and identifiers of coverage areas of one class of coverage areas detected at that position are generated and/or obtained. This step corresponds to step 501 of flowchart 500 of FIG. 5 as described above.

In step 602, M is set to the number of identifiers of coverage areas comprised in the detection data generated and/or obtained in step 601, and running variable m is set to 1.

In step 603, the CAR associated with the m-th identifier is updated (for instance based on the current generated/obtained detection data and/or on previously generated/obtained detection data). For instance, steps 703 to 708 of flowchart 700 of FIG. 7 described below are performed for the CAR associated with the m-th identifier. Therein, the update may also be expanding the size of the CAR based on the new detection data. In step 603, a positive hit counter maintained for at least a region of the CAR associated with the m-th identifier is furthermore increased. The region of the CAR associated with the m-th identifier may for instance be a region of a common grid of regions as described in more detail below (e.g. with respect to step 609). Since a positive hit counter is increased at least for a respective region of a CAR associated with a coverage area which identifier is comprised in the detection data, the respective region can be directly identified and the positive hit counter can be directly increased.

In step 604, it is determined whether m equals M. If it is determined that m does not equal M (i.e. m is smaller than M), flowchart 600 proceeds to step 605. In step 605, m is increased by 1 and steps 603-604 are iterated. Otherwise, flowchart 600 proceeds to step 606.

In step 606, CARs stored in radiomap database 33 covering the position of terminal 2-2 according to a first granularity and having the same class as the class present or expected in the detection data, but excluding the CARs associated with identifiers comprised in the detection data, are selected. In other words, all CARs are selected for which identifiers are expected to be comprised in the detection, but are not comprised therein.

For instance, each CAR stored in radiomap database 33 may be linked to one or more regions of a common grid of regions. In particular, each CAR may be linked to the regions of the common grid of regions which are at least partially covered by the CAR. Therein, the granularity describes the granularity of the common grid of regions (i.e. the size of the regions of the common grid of regions). For all CARs stored in radiomap database 33, the size of the regions of the grid may be the same. Alternatively, the size may be variable, for instance for different classes of coverage areas. The common grid of regions may for instance be a grid with rectangular, triangular, hexagonal regions (or cells), to name but a few non-limiting examples. The common grid of regions may for instance be a global grid for referencing locations on the Earth.

Thus, the region of the common grid of regions comprising the position of terminal 2-2 comprised in the detection data may firstly be determined, and, then, the CARs linked to the determined region and associated with coverage areas having a class matching at least one class of one or more coverage areas for which respective identifiers are expected to be comprised in the detection data, but are not comprised therein, may be selected.

In step 607, N is set to the number of selected CARs, and running variable n is set to 1.

In optional step 608, it is determined whether the n-th CAR also covers the position of terminal 2-2 according to a second, finer granularity. As described with respect to step 606, each CAR stored in radiomap database 33 may be linked to one or more regions of a common grid of regions, wherein the granularity may describe the granularity of the common grid of regions (i.e. the size of the regions of the common grid of regions). For instance, a common grid of regions with the second, finer granularity may be a subdivision of the common grid of regions applied in step 606. For instance, at least four regions of the common grid of regions with the second granularity may form a region of the common grid of regions with the first granularity. Alternatively and/or additionally, the determining may be based on the n-th CAR itself (instead of any regions of a grid of regions linked to the n-th CAR).

If it is determined in step 608 that the n-th CAR also covers the position of terminal 2-2 according to a second, finer granularity, flowchart 600 proceeds to step 609. Otherwise, flowchart 600 may for instance proceed to step 610.

In step 609, a negative hit counter maintained at least for a region of the n-th CAR is increased. The region of the n-th CAR may for instance be the region of the common grid of regions with the first granularity (as determined in step 606, if step 608 is not performed) or the second granularity (as determined in step 608) comprising the position of collector terminal 2-2 comprised in the detection data. Alternatively, the region of the n-th CAR may be a region of a grid of regions with an even finer granularity than the first and second granularity, for instance a grid of regions only for the n-th CAR or another common grid of regions for each CAR stored in radiomap database 33. For instance, for each region of a CAR stored in radiomap database 33, a negative hit counter may be stored in radiomap database 33. Furthermore, for each region of a CAR stored in radiomap database 33, also a positive hit counter may be stored in radiomap database 33.

In step 610, it is determined whether n equals N. If it is determined that n does not equal N (i.e. n is smaller than N), flowchart 600 proceeds to step 611. Otherwise, flowchart 600 is terminated. In step 611, n is increased by 1 and steps 608-610 are iterated.

The steps of flowchart 600 may for instance at least partially (e.g. entirely) be performed by collector terminal 2-2. For instance, steps 601-602, 604-607 and 610-611 may be performed by collector terminal 2-2 at least partially based on a local copy of radiomap database 33 stored in memory 22 of collector terminal 2-2, and steps 603 and 608-609 may be performed by server 3 which may for instance receive according instructions and/or detection data from terminal 2-2. Alternatively, the steps of flowchart 600 may for instance be entirely performed by server 3.

Figure 6B:
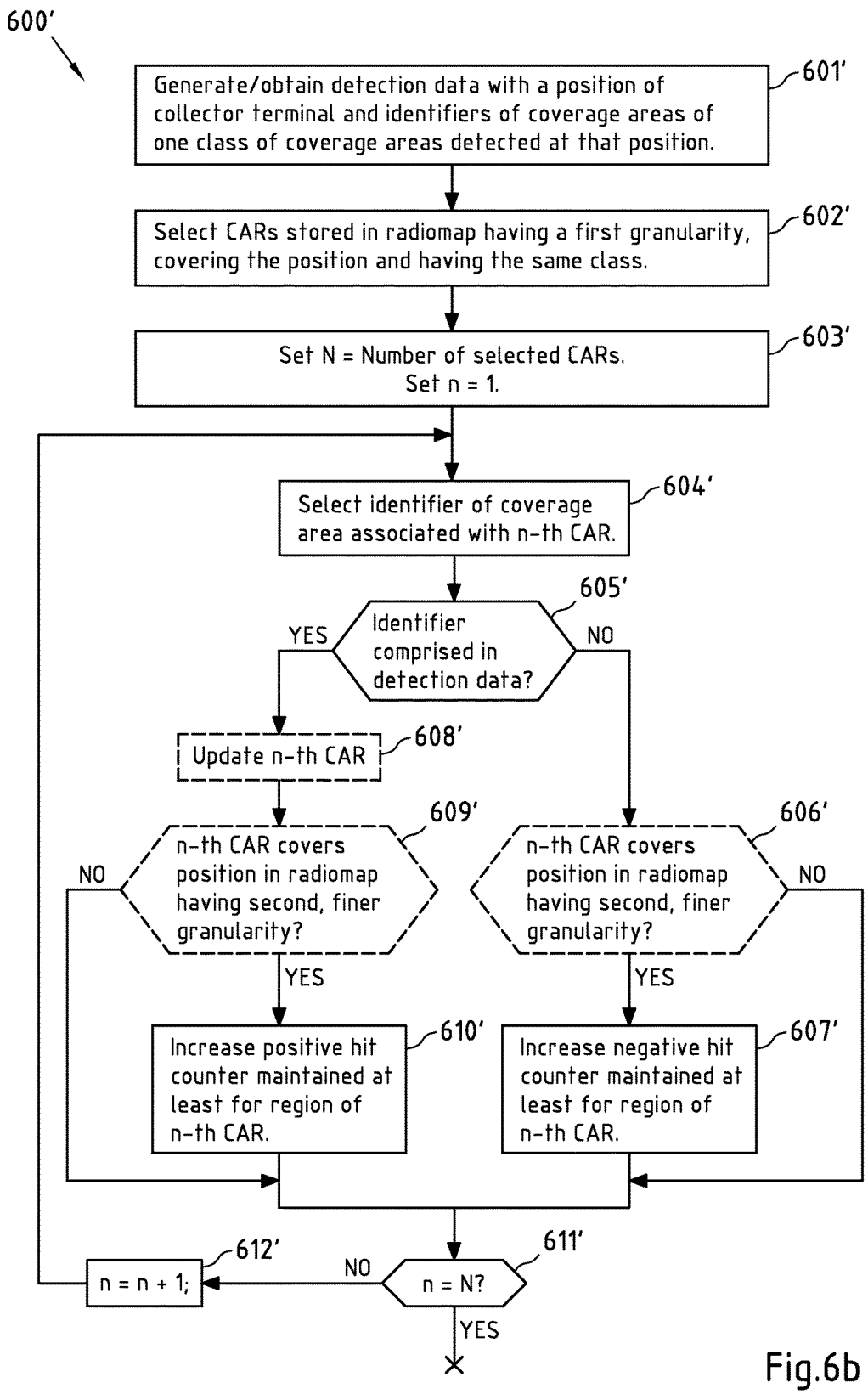
FIG. 6b: a flowchart of an example embodiment of a method according to the invention.

FIG. 6b is a flowchart 600' of a further example embodiment of a method according to the invention. Flowchart 600' basically also relates to maintaining negative and positive hit counters at least for a region of each CAR on which information is stored in radiomap database 33 (e.g. based on previously obtained and analysed detection data). In contrast to FIG. 6a, maintaining the positive hit counters (i.e. step 603 of flowchart 600 of FIG. 6a) and the negative hit counters is performed in the same loop (i.e. step 605'-610' of flowchart 600' of FIG. 6b).

In step 601', detection data with a position of collector terminal 2-2 and identifiers of coverage areas of one class of coverage areas detected at that position are generated and/or obtained. This step corresponds to step 501 of flowchart 500 of FIG. 5 and step 601 of flowchart 600 of FIG. 6a as described above.

In step 602', CARs stored in radiomap database 33, covering the position of terminal 2-2 according to a first granularity and having the same class as the class present or expected in the detection data, are selected.

As described above (e.g. with respect to step 606 of flowchart 600 of FIG. 6a), each CAR stored in radiomap database 33 may for instance be linked to one or more regions of a common grid of regions. In particular, each CAR may be linked to the regions of the common grid of regions which are at least partially covered by the CAR. Therein, the granularity describes the granularity of the common grid of regions (i.e. the size of the regions of the common grid of regions). For all CARs stored in radiomap database 33, the size of the regions of the grid may be the same. Alternatively, the size may be variable, for instance for different classes of coverage areas. The common grid of regions may for instance be a grid with rectangular, triangular, hexagonal regions (or cells), to name but a few non-limiting examples. The common grid of regions may for instance be a global grid for referencing locations on the Earth.

Thus, the region of the common grid of regions comprising the position of terminal 2-2 comprised in the detection data may firstly be determined, and, then, the CARs linked to the determined region and associated with coverage areas having a class matching at least one class of one or more coverage areas for which respective identifiers are comprised or at least expected to be comprised in the detection data may be selected.

In step 603', N is set to the number of selected CARs, and running variable n is set to 1.

In step 604', the identifier related to the coverage area associated with the n-th CAR of the CARs selected in step 602' is selected. As described above, the CARs and the identifiers related to the coverage areas associated therewith may be stored in radiomap database 33.

In step 605', it is determined whether the selected identifier is comprised in the detection data. If it is determined that the selected identifier is not comprised in the detection data, flowchart 600' proceeds to optional step 606'.

In optional step 606', it is determined whether the n-th CAR also covers the position of terminal 2-2 according to a second, finer granularity. This step corresponds to optional step 608 of flowchart 600 of FIG. 6a as described above.

If it is determined in step 606' that the n-th CAR also covers the position of terminal 2-2 according to a second, finer granularity, flowchart 600' proceeds to step 607'. Otherwise, flowchart 600' may for instance proceed to step 611' and/or an outlier processing may be performed.

In step 607', a negative hit counter maintained at least for a region of the n-th CAR is increased. This step corresponds to step 609 of flowchart 600 of FIG. 6a as described above.

The region of the n-th CAR may for instance be the region of the common grid of regions with the first granularity (as determined in step 602', if step 606' is not performed) or the second granularity (as determined in step 606') comprising the position of collector terminal 2-2 comprised in the detection data. Alternatively, the region of the n-th CAR may be a region of a grid of regions with an even finer granularity than the first and second granularity, for instance a grid of regions only for the n-th CAR or another common grid of regions for each CAR stored in radiomap database 33. For instance, for each region of a CAR stored in radiomap database 33, a negative hit counter may be stored in radiomap database 33. Furthermore, for each region of a CAR stored in radiomap database 33, also a positive hit counter may be stored in radiomap database 33.

If it is determined in step 605' that the selected identifier is comprised in the detection data, flowchart 600' proceeds to optional step 608'.

In optional step 608', the n-th CAR is updated (for instance based on the current generated/obtained detection data and/or on previously generated/obtained detection data). For instance, steps 703 to 708 of flowchart 700 of FIG. 7 described below are performed for the n-th CAR. Optional step 608' is inter-alia advantageous to prevent that a positive hit counter is increased for a region which is not (anymore) covered by the coverage area associated with the n-th CAR.

In optional step 609', it is determined whether the (optionally updated) n-th CAR also still covers the position of terminal 2-2 according to a second, finer granularity. This step corresponds to optional step 606' of flowchart 600' of FIG. 6b, as described above.

If it is determined in step 609' that the n-th CAR also covers the position of terminal 2-2 according to the second, finer granularity, flowchart 600' proceeds to step 610'. Otherwise, flowchart 600' may for instance proceed to step 611' and/or an outlier processing may be performed.

In step 610', a positive hit counter maintained for at least a region of the n-th CAR is increased.

In step 611', it is determined whether n equals N. If it is determined that n does not equal N (i.e. n is smaller than N), flowchart 600' proceeds to step 612'. Otherwise, flowchart 600' is terminated. In step 612', n is increased by 1 and steps 604'-611' are iterated.

Steps 608' to 610' (i.e. maintaining the positive hit counters) may alternatively be performed between steps 601' and 602' as described above (see for instance steps 602-605 of flowchart 600 of FIG. 6a). Steps 602' to 605' may only be necessary to identify at least a region of a CAR for which a negative hit counter is to be increased (i.e. as a precondition for steps 606' and 607').

The steps of flowchart 600' may for instance at least partially (e.g. entirely) be performed by collector terminal 2-2. For instance, steps 601'-605', 611' and 612' may be performed by collector terminal 2-2 at least partially based on a local copy of radiomap database 33 stored in memory 22 of collector terminal 2-2, and steps 606'-610' may be performed by server 3 which may for instance receive according instructions and/or detection data from terminal 2-2. Alternatively, the steps of flowchart 600' may for instance be entirely performed by server 3.

Figure 7:
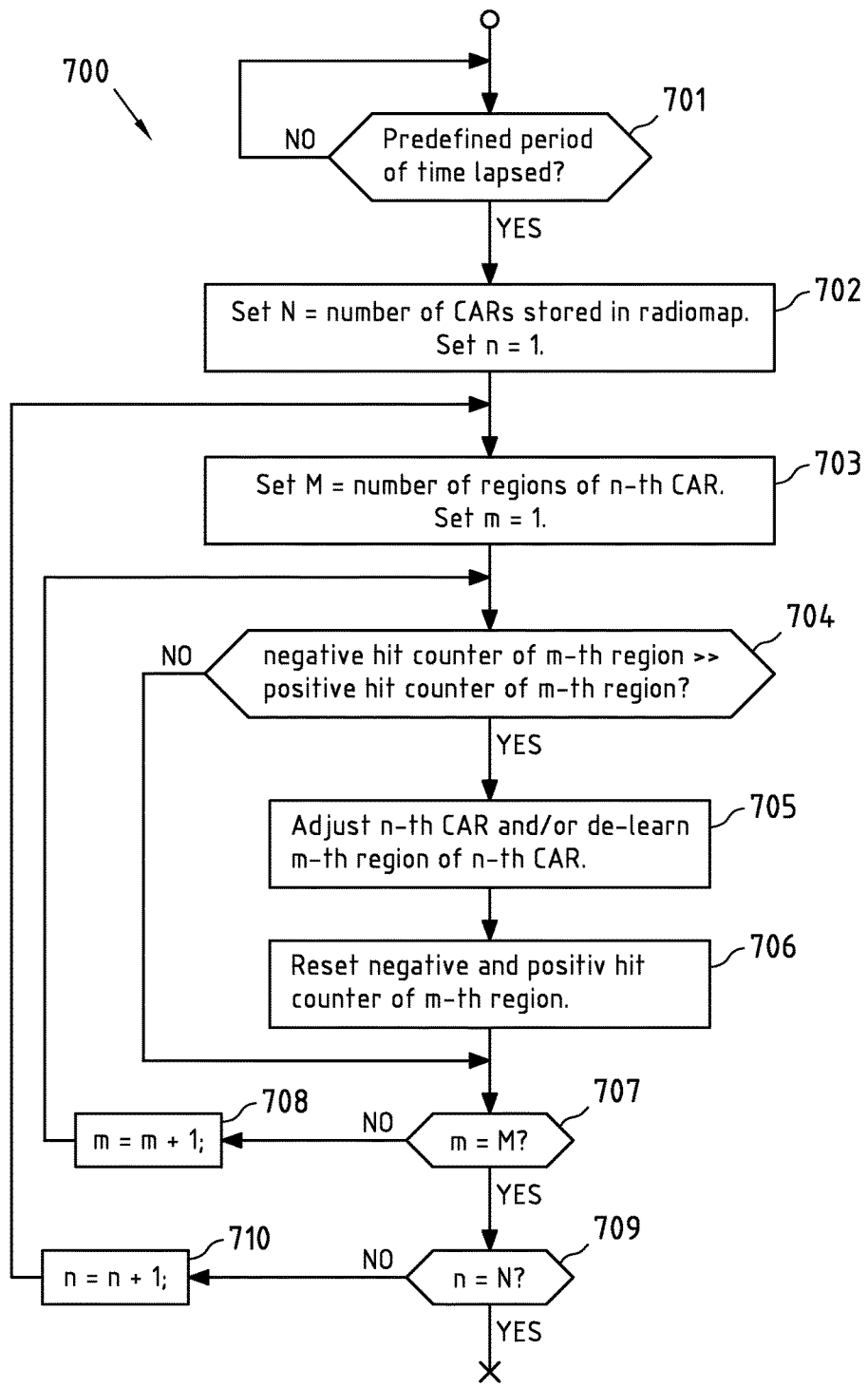
FIG. 7: a flowchart of an example embodiment of a method according to the invention.

FIG. 7 is a flowchart 700 of an example embodiment of a method according to the invention. Flowchart 700 basically relates to deciding whether a region of a CAR shall remain part of the CAR or shall be removed from the CAR. In particular, the method of FIG. 7 may serve to adapt the CAR to changes of the coverage area which have been detected by the collector terminals such that the CAR may represent previously obtained/generated detection data.

In step 701, it is determined whether a predefined period of time has lapsed. Non-limiting examples of a predefined period of time may be twelve hours, one day, one week, one month, and one year. Preferably the predefined period of time is a period of time according to the calendar. The predefined period of time may be adjusted depending on the current state of radiomap database 33 of server 3. The predefined period of time may be automatically adjustable and/or adjustable by a user.

If it is determined that the predefined period of time is lapsed, flowchart 700 proceeds to step 702. In step 702, N is set to the number of CARs stored in radiomap database 33 (or to a specific subset thereof, which may for instance have the same class), and running variable n is set to 1. (Note that also the case of M=1 may occur).

In step 703, M is set to the number of regions of the n-th CAR, and running variable m is set to 1. In flowchart 700 of FIG. 7, a region of the n-th CAR may be any region of a CAR for which a positive and/or a negative hit counter is maintained, as described above with respect to steps 603 and 609 of flowchart 600 of FIG. 6a and steps 607' and 610' of flowchart 600' of FIG. 6b.

The basic principle of de-learning according to the invention is based on the conclusion that, in case that there are (e.g. overwhelmingly) more negative hits to a given region of a CAR than positive hits, the coverage area associated with the CAR is considered to not cover that region (anymore) and, thus, the CAR stored in radiomap database 33 has to be adjusted accordingly.

In step 704, it is thus determined whether the number of negative hits counted by the negative hit counter of the m-th region overwhelmingly exceeds the number of positive hits counted by the positive hit counter of the m-th region. The number of negative hits may for instance be considered to overwhelmingly exceed the number of positive hits, if the number of negative hits is at least 1.5-times, preferably 2-times, larger than the number of positive hits. Alternatively, a difference between the number of negative hits and the number of positive hits may be compared against a predefined threshold.

If it is determined in step 704 that the number of negative hits counted by the negative hit counter of the m-th region (overwhelmingly) exceeds the number of positive hits counted by the positive hit counter of the m-th region, flowchart 700 proceeds to step 705. Otherwise, step 705 is skipped.

In step 705, the n-th CAR is adjusted accordingly (e.g. in case of M=1) and/or the m-th region of the n-th CAR is de-learned. Adjusting the n-th CAR and/or de-learning the m-th region of the n-th CAR may preferably be understood such that the m-th region is removed from the n-th CAR. Furthermore, one or more links between the CAR and one or more regions of a common grid of regions stored in radiomap database 33 as described above with respect to steps 606 and 608 of flowchart 600 of FIG. 6*a* and steps 602' and 606' of flowchart 600' of FIG. 6*b* may be adjusted accordingly.

In step 706, the negative hit counter and the positive hit counter of the m-th region are reset.

In step 707, it is determined whether m equals M. If it is determined that m does not equal M (i.e. m is smaller than M), flowchart 700 proceeds to step 708. Otherwise, flowchart 700 proceeds to step 709. In step 710, m is increased by 1 and, subsequently steps 704 to 707 are iterated.

In step 709, it is determined whether n equals N. If it is determined that n does not equal N (i.e. n is smaller than N), flowchart 700 proceeds to step 710. Otherwise, flowchart 700 is terminated. In step 710, n is increased by 1 and, subsequently steps 703 to 709 are iterated.

The steps of flowchart 700 may for instance at least partially be performed by server 3 based on information on the plurality of CARs stored in radiomap database 33. Alternatively, the steps of flowchart 700 may for instance be entirely performed by collector terminal 2-2 at least partially based on a local copy of radiomap database 33 stored in memory 22 of collector terminal 2-2 and locally maintained hit counters. In such an entirely terminal-based approach, terminal 2-2 may for instance provide update data to server 3 such as de-learning information in order to enable server 3 to update radiomap database 33 accordingly.

Figure 8:
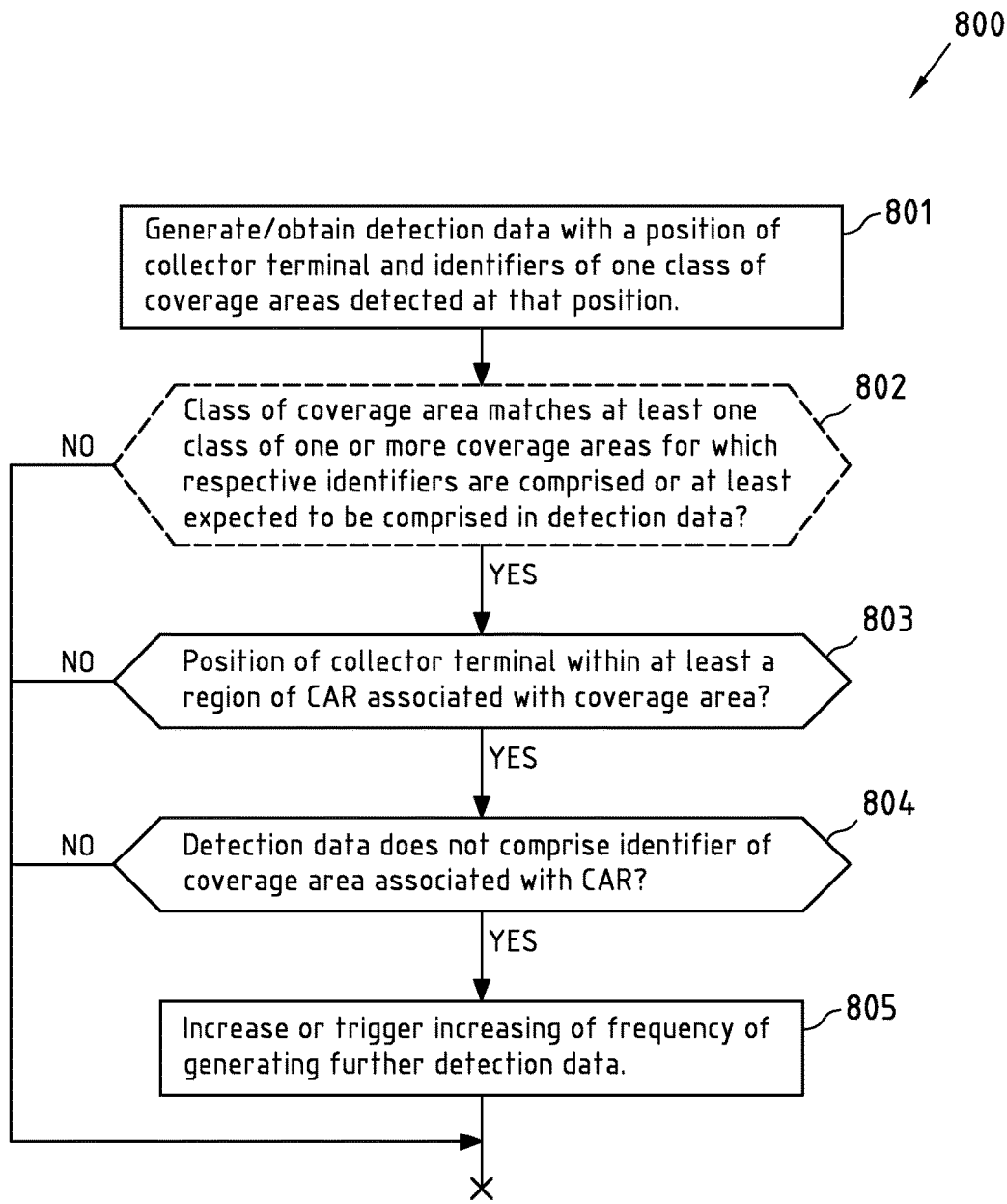
FIG. 8: a flowchart of an example embodiment of a method according to the invention.

FIG. 8 is a flowchart 800 of an example embodiment of a method according to the invention. Flowchart 800 basically relates to increasing a frequency of generating detection data based on generated detection data.

In step 801, detection data with a position of collector terminal 2-2 and identifiers related to coverage areas of one class of coverage areas detected at that position are generated and/or obtained. This step corresponds to step 501 of flowchart 500 of FIG. 5 and step 601 of flowchart 600 of FIG. 6*a* and step 601' of flowchart 600' of FIG. 6*b*.

In optional step 802, it is determined whether a class of a coverage area matches at least one class of one or more coverage areas for which respective identifiers are comprised or at least expected to be comprised in the detection data. This step corresponds to step 502 of flowchart 500 of FIG. 5 as described above. For instance, steps 802-805 of flowchart 800 may be iteratively performed for each coverage area associated with a CAR of the plurality of CARs stored in radiomap database 33.

If it is determined that the class of the coverage area matches the at least one class present or expected to be in the detection data, flowchart 800 proceeds to step 803. Otherwise flowchart 800 is terminated at least for the present coverage area and steps 802-805 may be iterated for another coverage area associated with another CAR of the plurality of CARs stored in radiomap database 33.

In step 803, it is determined whether the position of the collector terminal is within at least a region of a CAR associated with the coverage area. This step corresponds to step 503 of flowchart 500 of FIG. 5 as described above.

If it is determined that the position of the collector terminal is within at least a region of the CAR associated with the coverage area, flowchart 800 proceeds to step 804. Otherwise flowchart 800 is terminated at least for the present coverage area and steps 802-805 may be iterated for another coverage area associated with another CAR of the plurality of CARs stored in radiomap database 33.

In step 804, it is determined whether the detection data does not comprise an identifier related to the coverage area associated with the CAR. This step corresponds to step 504 of flowchart 500 of FIG. 5 as described above.

If it is determined that the detection data does not comprise an identifier related to the coverage area associated with the CAR, flowchart 800 proceeds to step 805. Otherwise flowchart 800 is terminated at least for the present coverage area and steps 802-805 may be iterated for another coverage area associated with another CAR of the plurality of CARs stored in radiomap database 33.

Steps 801-804 relate to detecting a negative hit at least for a region of a CAR. Therein, step 805 of flowchart 800 is only performed, if a negative hit for at least a region of the CAR is detected. In step 805, a frequency of generating further detection data is accordingly increased. For instance, the variable frequency with which terminal 2-2 generates the detection data may be increased.

The steps of flowchart 800 may for instance at least partially be performed by server 3. For instance, at least steps 802, 803 and 804 may be performed by server 3 based on detection data generated by collector terminal 2-2 in step 801. Step 805 may be performed by collector terminal 2-2 which may for instance receive according instructions from server 3. Alternatively, the steps of flowchart 800 may for instance be entirely performed by collector terminal 2-2 at least partially based on a local copy of radiomap database 33 stored in memory 22 of collector terminal 2-2.

As described above in example embodiments of the invention, a prerequisite for these embodiments is the existence of a radiomap database in which, for each coverage area that has previously been detected (e.g. detected by a collector terminal) in a given region, a CAR associated with the coverage area is stored.

The radiomap may for instance comprise information on coverage areas (or "cell objects", such as for instance GSM, WCDMA, TD-SCDMA, LTE, LTE-A, CDMA/CDMA2000 cell objects). Coverage areas may be accessible via their IDs (e.g. "cell IDs" such as for instance a Mobile Country Code (MCC), Mobile Network Code (MNC), Local Area Code (LAC), Cell ID (CID) or UTRAN (Universal Mobile Telecommunication System Terrestrial Radio Access Network) CID, to name but a few examples). Coverage areas may also be accessible via location. This can be realized by linking to the coverage areas some type of area/region objects that allow for accessing the coverage areas that can be observed in a given area. The following information on a coverage area may for instance be stored in the radiomap data base: the location of the CPE that provides the coverage area, the azimuth and/or range and/or beam width of the antenna of the CPE, physical resources assigned to the coverage area/CPE (e.g. in case of a GSM cell these can be Base Identity Code, BSIC, and Broadcast Control Channel carrier frequency, BCCH), a CAR and/or Rx levels in multiple locations within the coverage area.

Figure 9A:
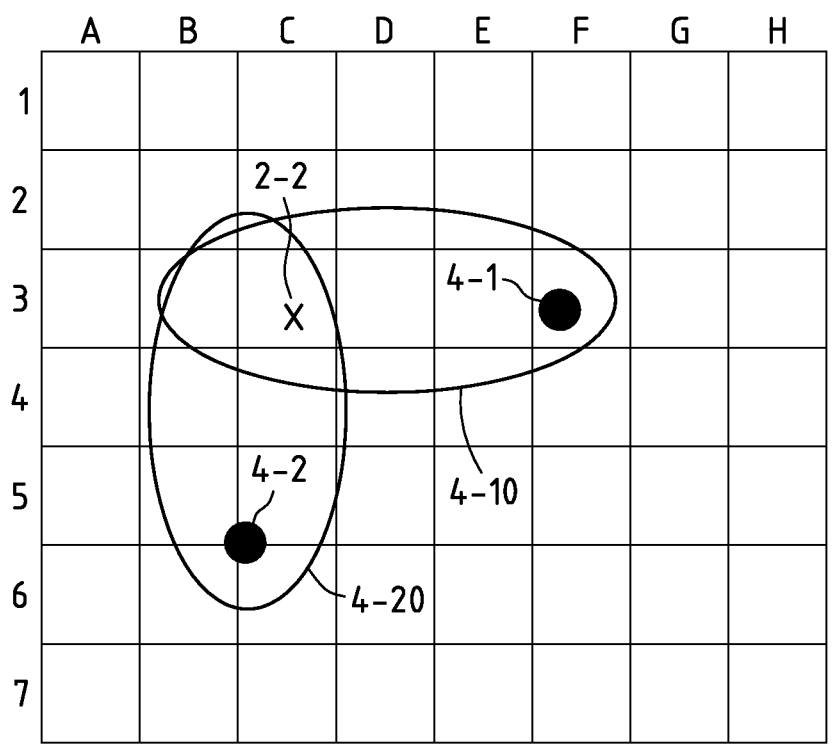
FIG. 9a: a schematic illustration of an example of a scenario of system 1 of FIG. 1 according to the invention.

With the help of FIGS. 9*a* and 9*b*, an example of the structure of radiomap database 33 of server 3 is explained below. In FIG. 9*a*, an exemplary scenario of system 1 of FIG. 1 is illustrated. In particular, the positions of terminal 2-2, the positions of CPEs 4-1 and 4-2, the CAR 4-10 associated with the coverage area provided by CPE 4-1 and the CAR 4-20 associated with the coverage area provided by CPE 4-2 are (exemplary) illustrated in FIG. 9*a*. Furthermore, a common grid of regions is displayed dividing CARs 4-10 and 4-20 into regions. Therein, the regions can be uniquely identified by a two-digit combination of their respective column ("A" to "H") and row ("1" to "7") identifiers. For instance, the region comprising the position of terminal 2-2 is identified by "C3". CARs 4-10 and 4-20 are here exemplarily assumed to relate to an elliptical coverage area model.

The regions of the common grid of regions displayed in FIG. 9a may for instance represent quadrants of a two-dimensional grid dividing the Earth's surface. The grid may for instance be conceived by dividing the longitude and latitude axis into quadrants with a granularity of 0.1 by 0.1 degrees (of course, also higher or lower granularities could be used), resulting to a grid of 3600×1800 (i.e. ~6.5e6) quadrants with the longitude span of 360 degrees and latitude span of 180 degrees. At the equator, this would correspond to a region size of 11 km times 11 km. In minimum a region may then be identified by using 12+11=23 bits.

Figure 9B:
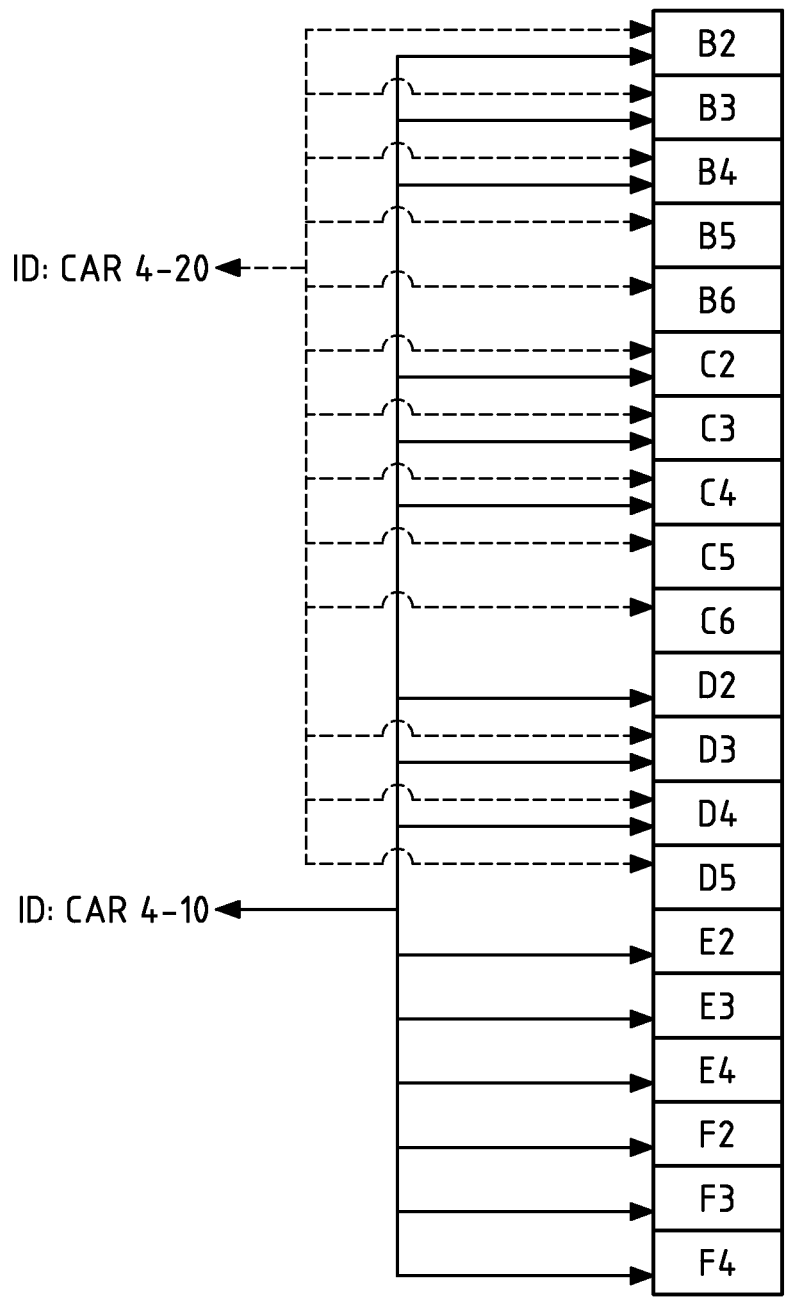
FIG. 9b: a schematic illustration of an example of a structure of database 33 of FIG. 3 according to the invention.

In FIG. 9b, an exemplary structure of radiomap database 33 for the scenario illustrated in FIG. 9a is depicted. Therein, the identifier of CPE 4-1 providing the coverage area associated with CAR 4-10 has been linked to each region which is at least partially covered by CAR 4-10, and the identifier of CPE 4-2 providing the coverage area associated with CAR 4-20 has been linked to each region which is at least partially covered by CAR 4-20. For instance, the identifier of CPE 4-1 has been linked to regions identified by the following two digit combinations: B2, B3, B4, C2, C3, C4, D2, D3, D4, E2, E3, E4, F2, F3 and F4. As can be seen from FIG. 9b, these links are two-way. Further information which may be stored in radiomap database 33 of server 3 is the class of each coverage area associated with a CAR of the plurality of CARs stored therein.

When each CAR is two-way linked to a region, it is possible to pick other CARs overlapping the CAR in a specific region. Moreover, should there be a change in a CAR, then only the links of the CAR with the regions may have to be updated accordingly. In an alternative implementation with CARs linked with each other directly, there would be a significant amount of associations to update in case of such a change. Those associations may have to be searched via an exhaustive search in the radiomap database. In contrast, the proposed structure of the radiomap database using the common grid of regions as an adaptation layer is simple, because it is possible to link CARs to one or more respective regions. In particular, this exemplary structure of radiomap database 33 allows for accessing all the CARs associated with coverage areas detectable in a given region. For instance, the proposed structure allows efficiently selecting all CARs stored in radiomap database 33 covering the position of terminal 2-2.

In the exemplary scenario of FIG. 9a, detection data may be generated by terminal 2-2 comprising the position of terminal 2-2 (i.e. in region "C3") and the identifiers related to the coverage areas associated with CAR 4-10 and 4-20 heard at that position. The coverage areas of which identifiers are comprised in the detection data form a first set which is called set "D" in the following.

In a cellular CS the coverage areas may correspond to cells which may be identified by their Global Cell Identities or Locally Unique Identities (e.g. BSIC-BCCH combination in a GSM cell). In a cellular CS, the detection data may furthermore comprise cellular measurement information such as signal strength, code power, chip power, timing advance and/or pathloss. Typical cellular measurements are defined in various mobile location standards such as 3GPP TS 36.355 LTE Positioning Protocol and Open Mobile Alliance LTE Positioning Protocol Extensions.

In the following, it is assumed that the detection data generated by terminal 2-2 is send to server 3 which further processes the detection data. However, it is noted that the invention is not limited thereto and that the detection data may at least partially also be further processed by terminal 2-2.

Server 3 selects the coverage areas which should be detected at the position of terminal 2-2 (i.e. in region "C3") based on the radiomap database 33. For instance, the CARs associated with the coverage areas and linked to the region of the common grid of regions comprising the position of terminal 2-2 comprised in the detection data are selected. The selected coverage areas or the CARs associated with the coverage areas form a second set which is called set "S" in the following. In the exemplary structure of radiomap database 33 illustrated in FIG. 9b, region "C3" is linked to identifiers (i.e. identifier of CPE 4-1 and 4-2, respectively) related to coverage areas associated with CAR 4-10 and 4-20 such that the coverage areas associated with CAR 4-10 and 4-20 are included in set "S".

In case of a cellular CS, set "S" may only carry those CARs associated with coverage areas (e.g. related to cells of the cellular CS) that belong to the same operator and the same CS as the coverage areas identified in the detection data. Moreover, also the technology may have to be taken into account. If in the detection data, for instance, only coverage areas are identified relating to GSM cells, then the set "S" does for instance not include coverage areas related to WCDMA cells, because terminal 2-2 may not support WCDMA. An exemplary step of determining set "S" is described above with respect to step 602' of flowchart 600' of FIG. 6b.

Then a subset of set "S" is formed by excluding from set "S" those coverage areas also included in set "D". The subset is called set "C" in the following. An exemplary step of determining set "C" is described above with respect to step 606 of flowchart 600 of FIG. 6a and step 604'-605' of flowchart 600' of FIG. 6b (which are iteratively performed for each coverage area included in set "S").

In order to increase resolution, server 3 may optionally determine more precisely whether the coverage area(s) included in set "C" really cover(s) the position of terminal 2-2 comprised in the detection data. An exemplary step of such a determining is described above with respect to optional step 608 of flowchart 600 of FIG. 6a and 606' of flowchart 600' of FIG. 6b (which is performed for each coverage area included in set "C").

To exemplify, consider detection data received at server 3 may comprise a position of collector terminal 2-2 in region "C3" of the common grid of regions displayed in FIG. 9a. Based on CARs 4-10 and 4-20 stored in radiomap database 33, server 3 determines that coverage areas provided by CPEs 4-1 and 4-2 should be detectable at that position. However, if the coverage area provided by CPE 4-2 is not identified in the detection data, it is included in the set "C". Nevertheless, a closer analysis of CAR 4-20 shows that, in case the position of the collector terminal was in the upper right corner of region "C3", CAR 4-20 does not cover that position and, thus, the coverage area provided by CPE 4-2 should actually not be identified in the detection data. In this case, the coverage area provided by CPE 4-2 is removed from set "C". However, in case the position of the collector terminal was not in the upper right corner of region "C3" (as shown in FIG. 9a), then the coverage area provided by CPE 4-2 should be detected at that position and definitely belongs to set "C".

Note that this step is optional and/or dependent on the granularity of the common grid of regions displayed in FIG. 9a. If the size of quadrants of the common grid of regions displayed in FIG. 9a is sufficiently small, it may be unnecessary to determine more precisely whether the coverage area(s) included in set "C" cover(s) the position of terminal 2-2 comprised in the detection data. However, from a performance point of view, it may be beneficial to firstly roughly figure out the potentially problematic coverage areas and then fine tune set "C" based on a further analysis.

It is now assumed that set "C" is not empty, but includes the coverage area provided by CPE 4-2 and that the scenario as illustrated in FIG. 9a applies (i.e. the position of the collector terminal is the position of terminal 2-2 as illustrated in FIG. 9a). This implies that the coverage area provided by CPE 4-2 has been changed and, thus, a negative hit counter maintained for a region of CAR 4-20 comprising the position of terminal 2-2 comprised in the detection data is increased by 1 in order to allow de-learning of that region of CAR 4-20.

For instance, in radiomap database 33, information on an activity grid of regions is stored for each CAR of the plurality of CARs stored in radiomap database 33. For instance, a CAR may be linked to regions of such an activity grid as described above. The activity grid may be a common activity grid for the plurality of CARs stored in radiomap database 33 or it may be different for each CAR of the plurality of CARS stored in radiomap database 33.

Note that the granularity of such an activity grid may be much more tighter than the granularity of the common grid(s) of regions used for determining set "S" (e.g. step 602' of flowchart 600' of FIG. 6b) and/or fine tuning set "C" (e.g. optional step 608 of flowchart 600 of FIG. 6a and optional step 606' of flowchart 600' of FIG. 6b) as described above. For instance, the granularity of the activity grid may be in the order of a few hundred metres, whereas the granularity of the common grid(s) of regions may be in the order of kilometres. However, the activity grid may also equal the common grid of regions. Each region of an activity grid of a CAR is associated with at least one of a positive hit counter and a negative hit counter. Preferably, each region of an activity grid of a CAR is associated with at least two respective hit counters that count positive and negative hits to the region (i.e. detected positive and negative hits to the region), for instance during a given period of time such as one day, one week, one month and one year, to name but a few non-limiting examples.

Figure 10:
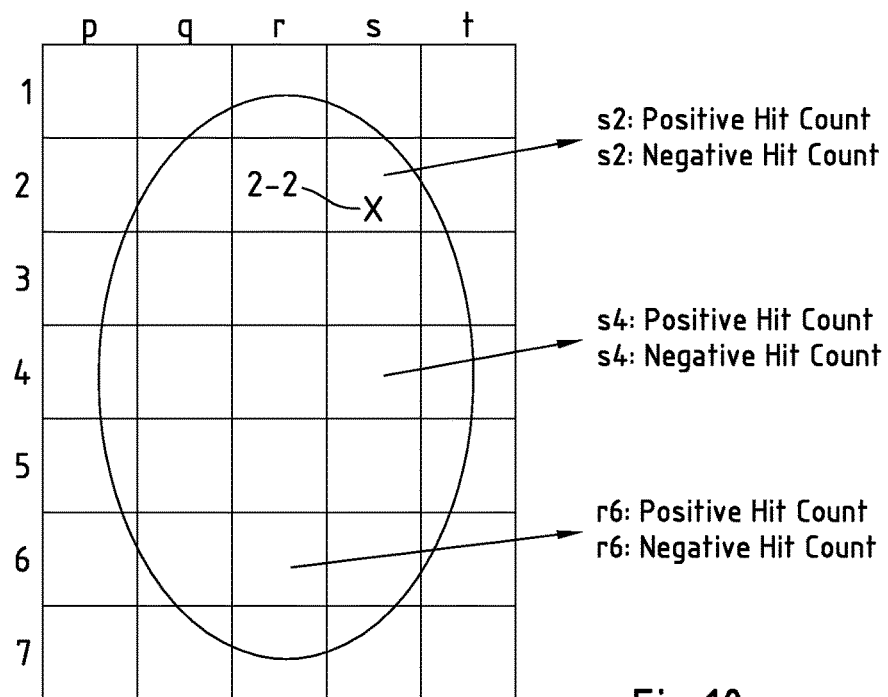
FIG. 10: a schematic illustration of an example of an activity grid of a CAR according to the invention.

In FIG. 10, an exemplary activity grid for CAR 4-20 stored in radiomap database 33 is displayed. As apparent from FIG. 10, the granularity of the activity grid is finer than the granularity of the common grid of regions displayed in FIG. 9a. Region "s2" of the activity grid comprises the position of terminal 2-2 comprised in the detection data. Accordingly, the negative hit counter maintained for region "s2" of CAR 4-20 is increased by 1. An exemplary step of increasing a negative hit counter maintained for at least a region of a CAR is described above with respect to step 609 of flowchart 600 of FIG. 6a and step 607' of flowchart 600' of FIG. 6b (which is performed for each coverage area included in set "C"). Alternatively, in case that set "C" does not include the coverage area provided by CPE 4-2 and that the scenario as illustrated in FIG. 9a still applies (i.e. the position of the collector terminal is the position of terminal 2-2 as illustrated in FIG. 9a), the positive hit counter maintained for region "s2" of CAR 4-20 is increased by 1. An exemplary step of increasing a positive hit counter maintained for at least a region of a CAR is described above with respect to step 603 of flowchart 600 of FIG. 6a and step 610' of flowchart 610' of flowchart 600' of FIG. 6b (which is performed for each coverage area included in set "S", but not included in set "C").

The basic principle of de-learning according to example embodiments of the invention is based on the conclusion that, in case there are (overwhelmingly) more negative hits to a given region of an activity grid of a CAR than positive hits, the coverage area associated with the CAR does not cover that region (anymore) and, thus, the CAR stored in radiomap database 33 of server 3 has to be adjusted accordingly. For instance, it is then determined whether the adjusted CAR still covers the one or more regions of the common grid(s) of regions to which it is linked in radiomap database 33. If it is determined that it does not cover a region of the one or more regions of the common grids of regions to which it is linked in radiomap database 33, the link between the region and the CAR may be removed accordingly. Moreover, if Rx level samples are stored for the CAR for high precision positioning (e.g. conventional fingerprinting), the Rx level samples are also removed for the region. The step of adjusting and de-learning may be performed for a CAR or all CARs stored in radiomap database 33 of server 3 after a predefined period of time.

Due to outliers (e.g. errors in (A)GNSS based positioning) in the detection data, there may also be false negative hits to a given region of an activity grid of a CAR. This may for instance be the case when the real position of the collector terminal currently is outside of the coverage area, but the determined/measured position of the collector terminal is erroneous and thus is reported to be inside the coverage area. In this (rare) case, a negative hit to the region of the activity grid of the CAR covering the erroneously determined current position may occur. However, those outliers should only be few and, hence, a larger (e.g. overwhelmingly) number of negative hits than positive hits indicates that the coverage area does not cover the given region (anymore).

Moreover, there might also be scenarios, in which there are negative hits to a given region of an activity grid of a CAR, where the coverage area associated with the CAR (still) covers the region. This may for instance be the case, if for instance eight coverage areas can be detected in that region, but the collector terminal is only capable of detecting six coverage areas simultaneously (e.g. due to technical limitations). This constraint may thus result in an increase of the negative hit counter of a region of an activity grid of at least two CARs. Nevertheless, the number of positive hits will offset the negative hits such that the net result is still applicable. Moreover, holes in the radio coverage result in negative hits due to natural reasons (physically impossible to hear the coverage area at a specific position).

An exemplary step of adjusting and/or delearning is described above with respect to step 705 of flowchart 700 of FIG. 7.

Figure 11:
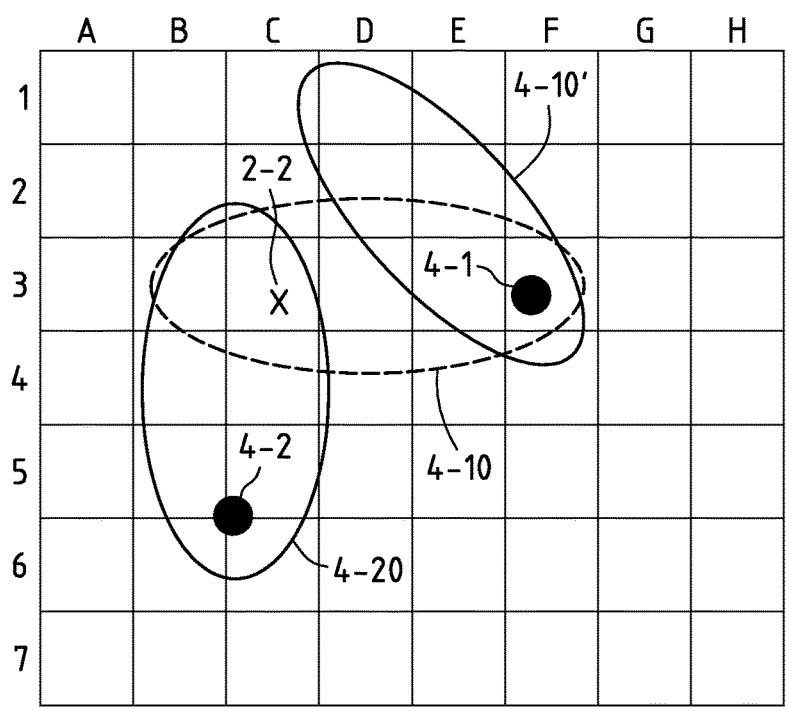
FIG. 11: a schematic illustration of the scenario of FIG. 9a after a change of the coverage area provided by CPE 4-1.

In FIG. 11, the exemplary scenario of FIG. 9a is illustrated after a change of the coverage area provided by CPE 4-1 occurred. For instance, an antenna arrangement of CPE 4-1 has been turned clockwise. Dashed CAR 4-10 denotes the CAR correctly representing the coverage area provided by CPE 4-1 before the change. CAR 4-10' denotes the CAR correctly representing the coverage area provided by CPE 4-1 after the change.

Before the change, collector terminal 2-2 positioned in region "C3" detects the coverage area provided by CPE 4-1 and the coverage area provided by CPE 4-2 and may send corresponding detection data to server 3 such that positive hit counters maintained for respective regions of CAR 4-10 and 4-20 comprising the position of collector terminal 2-2 are increased.

After the change, collector terminal 2-2 positioned in region "C3" only detects the coverage area provided by CPE 4-2 and may send corresponding detection data to server 3 such that the positive hit counter maintained for a respective region of CAR 4-20 comprising the position of collector terminal 2-2 is increased. Furthermore, in case radiomap database 33 has not been adapted to the change, the negative hit counter maintained for a respective region of CAR 4-10 comprising the position of collector terminal 2-2 is increased. After a predefined period of time, the positive and negative hit counters maintained for the respective region of CAR 4-10 may be evaluated, and CAR 4-10 may be adjusted such that it equals CAR 4-10'. Furthermore, radiomap database 33 may be updated such that CAR 4-10 may then be linked to the following regions of the common grid of regions displayed in FIG. 9a and FIG. 11: C1, C2, D1, D2, D3, E1, E2, E3, E4, F2, F3, and F4.

Furthermore, the collector terminal 2-2 generating the detection data may locally analyse the detection data based on a local copy of radiomap database 33 stored in memory 22. In case collector terminal 2-2 determines any suspicious detections (i.e. not all coverage areas that should be detected are detected), it may for instance accelerate generating the detection data at least in a respective region and thus provide evidence to server 3 on a potentially changed radio environment.

Example embodiments of the invention thus inter alia allow for an efficient method of adapting the CAR associated with a coverage area to changes in the coverage area, in particular for de-learning regions of coverage areas and the associated characteristics, where the region no longer exists.

As used in this application, the term 'circuitry' refers to all of the following:
(a) hardware-only circuit implementations (such as implementations in only analog and/or digital circuitry) and
(b) combinations of circuits and software (and/or firmware), such as (as applicable):
(i) to a combination of processor(s) or
(ii) to portions of processor(s)/software (including digital signal processor(s)), software, and memory(ies) that work together to cause an apparatus, such as a mobile phone or a positioning device, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a positioning device.

As used in this application, the wording "X comprises A and B" (with X, A and B being representative of all kinds of words in the description) is meant to express that X has at least A and B, but can have further elements. Furthermore, the wording "X based on Y" (with X and Y being representative of all kinds of words in the description) is meant to express that X is influenced at least by Y, but may be influenced by further circumstances. Furthermore, the undefined article "a" is—unless otherwise stated—not understood to mean "only one".

The invention has been described above by means of embodiments, which shall be understood to be non-limiting examples. In particular, it should be noted that there are alternative ways and variations which are obvious to a skilled person in the art and can be implemented without deviating from the scope and spirit of the appended claims. It should also be understood that the sequence of method steps in the flowcharts presented above is not mandatory, also alternative sequences may be possible.

The invention claimed is:

1. A method, performed by an apparatus, said method comprising:
generating or obtaining detection data, said detection data comprising:
position data that is indicative of a position of a terminal and
one or more identifiers respectively related to one or more coverage areas detected by said terminal, and
detecting a negative hit for at least a region of a coverage area representation associated with a coverage area, if at least all of the following conditions (i)-(iii) hold:
(i) a class of said coverage area matches at least one class of one or more coverage areas for which respective identifiers are comprised or at least expected to be comprised in said detection data,
(ii) said position of said terminal is within said region, and
(iii) said detection data does not comprise an identifier related to said coverage area associated with said coverage area representation,
using and/or providing at least information on said detected negative hit for deciding if said region of said coverage area representation shall remain part of said coverage area representation or shall be removed from said coverage area representation, and/or for deciding whether a frequency of generating detection data shall be increased, and further comprising:
increasing a negative hit counter maintained for said region of said coverage area representation if a negative hit for said region of said coverage area representation is detected, wherein said information on said detected negative hit is said negative hit counter.

2. The method of claim 1, further comprising:
detecting a positive hit for said region of said coverage area representation, if at least all of the following conditions (i)-(ii) hold:
(i) said position of said terminal comprised in said detection data is within said region and
(ii) said detection data comprises said identifier related to said coverage area associated with said coverage area representation,
at least information on at least one of said detected positive hit and said detected negative hit being provided and/or used for said deciding if said region of said coverage area representation shall remain part of said coverage area representation or shall be removed from said coverage area representation.

3. The method of claim 1, further comprising:
detecting a positive hit for said region of said coverage area representation, if at least all of the following conditions (i)-(ii) hold:
(i) said position of said terminal comprised in said detection data is within said region and (ii) said detection data comprises said identifier related to said coverage area associated with said coverage area representation, increasing a positive hit counter maintained for said region of said coverage area representation if a positive hit for said region of said coverage area representation is detected, at least said positive hit counter and said negative hit counter being provided and/or used for said deciding if said region of said coverage area representation shall remain part of said coverage area representation or shall be removed from said coverage area representation.

4. The method of claim 3, wherein it is decided that said region shall be removed from said coverage area representation if said negative hit counter is larger than said positive hit counter or if a difference between or a ratio of said negative hit counter and said positive hit counter exceeds a pre-defined or a determined threshold.

5. The method of claim 4, wherein said deciding is performed after a determined time period has lapsed and/or when the negative hit counter exceeds a determined threshold value.

6. The method according to any of the claim 1, further comprising:
determining, based on said detection data and on a database that comprises information on a plurality of coverage area representations and information on their associated coverage areas, a first set of one or more coverage areas that at least comprises said coverage area associated with said coverage area representation that has said region.

7. The method according to claim 6, wherein said first set of one or more coverage areas is determined to comprise each coverage area that
(i) is associated with a coverage area representation comprised in said database and covering said position of said terminal and
(ii) has a class that matches at least one class of said one or more coverage areas for which respective identifiers are comprised or at least expected to be comprised in said detection data.

8. The method according to claim 7, wherein in case that a negative hit is detected for said region of said coverage area representation, said coverage area representation is associated with a coverage area of said first set of coverage areas for which it has been checked that no respectively related identifier is comprised in said detection data.

9. The method according to claim 6, wherein said first set of one or more coverage areas is determined to comprise each coverage area that
(i) is associated with a coverage area representation comprised in said database and covering, when represented with a first granularity, said position of said terminal and
(ii) has a class that matches at least one class of said one or more coverage areas for which respective identifiers are comprised or at least expected to be comprised in said detection data, wherein in case that a negative hit is detected for said region of said coverage area representation, said coverage area representation is associated with a coverage area of said first set of coverage areas for which it has been checked that no respectively related identifier is comprised in said detection data and that it is associated with a coverage area representation that, when represented with a second granularity that is finer than said first granularity, still covers said position of said terminal.

10. The method according to claim 9, wherein said region of said coverage area representation is formed with said second granularity.

11. The method according to clam 1, wherein said region is a quadrant of a grid of quadrants obtainable by dividing a longitude axis and a latitude axis of the Earth into a plurality of quadrants of size x times y degrees, wherein x and y are real numbers.

12. An apparatus, comprising at least one processor; and at least one memory including computer program code, said at least one memory and said computer program code configured to, with said at least one processor, cause said apparatus at least to perform:
generating or obtaining detection data, said detection data comprising:
position data that is indicative of a position of a terminal and
one or more identifiers respectively related to one or more coverage areas detected by said terminal, and
detection of a negative hit for at least a region of a coverage area representation associated with a coverage area, if at least all of the following conditions (i)-(iii) hold:
(i) a class of said coverage area matches at least one class of one or more coverage areas for which respective identifiers are comprised or at least expected to be comprised in said detection data,
(ii) said position of said terminal is within said region, and
(iii) said detection data does not comprise an identifier related to said coverage area associated with said coverage area representation,
using and/or providing at least information on said detected negative hit for deciding if said region of said coverage area representation shall remain part of said coverage area representation or shall be removed from said coverage area representation, and/or for deciding whether a frequency of generate detection data shall be increased, and
increasing a negative hit counter maintained for said region of said coverage area representation if a negative hit for said region of said coverage area representation is detected, wherein said information on said detected negative hit is said negative hit counter.

13. The apparatus of claim 12, wherein said at least one memory and said computer program code are configured to, with said at least one processor, cause said apparatus to perform:
detection of a positive hit for said region of said coverage area representation, if at least all of the following conditions (i)-(ii) hold:
(i) said position of said terminal comprised in said detection data is within said region and
(ii) said detection data comprises said identifier related to said coverage area associated with said coverage area representation,
at least information on at least one of said detected positive hit and said detected negative hit being provided and/or used for said decide if said region of said coverage area representation shall remain part of said coverage area representation or shall be removed from said coverage area representation.

14. The apparatus of claim 13, wherein said at least one memory and said computer program code are configured to, with said at least one processor, cause said apparatus to perform:
 detection of a positive hit for said region of said coverage area representation, if at least all of the following conditions (i)-(ii) hold:
 (i) said position of said terminal comprised in said detection data is within said region and
 (ii) said detection data comprises said identifier related to said coverage area associated with said coverage area representation,
 increment a positive hit counter maintained for said region of said coverage area representation if a positive hit for said region of said coverage area representation is detected,
 at least said positive hit counter and said negative hit counter being provided and/or used for said decide if said region of said coverage area representation shall remain part of said coverage area representation or shall be removed from said coverage area representation.

15. The apparatus of claim 14, wherein it is decided that said region shall be removed from said coverage area representation if said negative hit counter is larger than said positive hit counter or if a difference between or a ratio of said negative hit counter and said positive hit counter exceeds a pre-defined or a determined threshold.

16. The apparatus of claim 15, wherein said deciding is performed after a determined time period has lapsed and/or when the negative hit counter exceeds a determined threshold value.

17. The apparatus according to claim 16, wherein in case that a negative hit is detected for said region of said coverage area representation, said coverage area representation is associated with a coverage area of said first set of coverage areas for which it has been checked that no respectively related identifier is comprised in said detection data.

18. The apparatus according to claim 15, wherein said first set of one or more coverage areas is determined to comprise each coverage area that
 (i) is associated with a coverage area representation comprised in said database and covering said position of said terminal and
 (ii) has a class that matches at least one class of said one or more coverage areas for which respective identifiers are comprised or at least expected to be comprised in said detection data.

19. The apparatus according to claim 12, wherein said at least one memory and said computer program code are configured to, with said at least one processor, cause said apparatus to:
 determine, based on said detection data and on a database that comprises information on a plurality of coverage area representations and information on their associated coverage areas, a first set of one or more coverage areas that at least comprises said coverage area associated with said coverage area representation that has said region.

20. The apparatus according to claim 19, wherein said first set of one or more coverage areas is determined to comprise each coverage area that
 (i) is associated with a coverage area representation comprised in said database and covering, when represented with a first granularity, said position of said terminal and
 (ii) has a class that matches at least one class of said one or more coverage areas for which respective identifiers are comprised or at least expected to be comprised in said detection data, wherein in case that a negative hit is detected for said region of said coverage area representation, said coverage area representation is associated with a coverage area of said first set of coverage areas for which it has been checked that no respectively related identifier is comprised in said detection data and that it is associated with a coverage area representation that, when represented with a second granularity that is finer than said first granularity, still covers said position of said terminal.

21. The apparatus according to claim 20, wherein said region of said coverage area representation is formed with said second granularity.

22. The apparatus according to claim 12, wherein said region is a quadrant of a grid of quadrants obtainable by dividing a longitude axis and a latitude axis of the Earth into a plurality of quadrants of size x times y degrees, wherein x and y are real numbers.

23. A computer program product comprising a non-transitory computer readable storage medium in which computer program code is stored, the computer program code configured to cause an apparatus to perform at least the following when executed by a processor:
 generating or obtaining detection data, said detection data comprising:
  position data that is indicative of a position of a terminal and
  one or more identifiers respectively related to one or more coverage areas detected by said terminal, and
 detecting a negative hit for at least a region of a coverage area representation associated with a coverage area, if at least all of the following conditions (i)-(iii) hold:
 (i) a class of said coverage area matches at least one class of one or more coverage areas for which respective identifiers are comprised or at least expected to be comprised in said detection data,
 (ii) said position of said terminal is within said region, and
 (iii) said detection data does not comprise an identifier related to said coverage area associated with said coverage area representation,
 using and/or providing at least information on said detected negative hit for deciding if said region of said coverage area representation shall remain part of said coverage area representation or shall be removed from said coverage area representation, and/or for deciding whether a frequency of generating detection data shall be increased, and
 increasing a negative hit counter maintained for said region of said coverage area representation if a negative hit for said region of said coverage area representation is detected, wherein said information on said detected negative hit is said negative hit counter.

* * * * *